(12) United States Patent
Higurashi et al.

(10) Patent No.: US 6,191,900 B1
(45) Date of Patent: Feb. 20, 2001

(54) DIGITAL SIGNAL RECORDING AND REPRODUCING APPARATUS AND RECORDING MEDIUM

(75) Inventors: Seiji Higurashi; Yoichi Zenno, both of Tokyo (JP)

(73) Assignee: Victor Company of Japan, Ltd., Yokohama (JP)

( * ) Notice: Under 35 U.S.C. 154(b), the term of this patent shall be extended for 0 days.

(21) Appl. No.: 09/060,144

(22) Filed: Apr. 15, 1998

(51) Int. Cl.$^7$ ...................................................... G11B 5/02
(52) U.S. Cl. ................. 360/18; 360/27; 360/70; 386/95; 386/124
(58) Field of Search .............. 386/95, 125, 126, 386/46, 124; 360/27, 8, 18, 64, 61, 70

(56) References Cited

U.S. PATENT DOCUMENTS

| | | | |
|---|---|---|---|
| 4,896,311 | 1/1990 | Ishihara | 369/47 |
| 5,301,070 | 4/1994 | Tanaka | 360/73.05 |
| 5,463,604 | 10/1995 | Naito | 369/50 |
| 5,966,496 | * 10/1999 | Takimoto | 386/95 |

FOREIGN PATENT DOCUMENTS

| | | |
|---|---|---|
| 0430043 | 6/1991 | (EP) . |
| 0649136 | 4/1995 | (EP) . |
| 0658880 | 6/1995 | (EP) . |
| 2295048 | 5/1996 | (GB) . |

* cited by examiner

Primary Examiner—Andrew L. Sniezek
(74) Attorney, Agent, or Firm—Pollock, Vande Sande & Amernick

(57) ABSTRACT

A digital signal recording and reproducing apparatus includes a plurality of heads. A digital signal containing an information signal is recorded on a recording medium via heads among the heads while tracks are sequentially formed on the recording medium. The digital signal is reproduced from the recording medium via heads among the heads. A reproduced signal processing circuit operates for processing the reproduced digital signal at a changeable data processing rate to recover the information signal from the reproduced digital signal. During the recording, a speed of the heads, a speed of the recording medium, a data rate of the recording, and a number of used heads are set to changeable values respectively. The digital signal and a mode signal representative of the set values are recorded on the tracks at approximately a predetermined constant recording wavelength. At a start of playback, the speed of the heads, the speed of the recording medium, the data processing rate, and the number of used heads are set to predetermined initial values respectively. The mode signal is recovered from the reproduced digital signal. After the start of playback, the speed of the heads, the speed of the recording medium, and the number of used heads are substantially equalized to the respective corresponding values represented by the recovered mode signal. After the start of playback, the data processing rate is controlled at a value substantially corresponding to the value of the data rate of the recording which is represented by the recovered mode signal.

6 Claims, 7 Drawing Sheets

DIGITAL SIGNAL RECORDING AND REPRODUCING APPARATUS AND RECORDING MEDIUM

BACKGROUND OF THE INVENTION

1. Field of the Invention

This invention relates to a digital signal recording and reproducing apparatus. Also, this invention relates to a recording medium.

2. Description of the Related Art

There is a known digital VTR (video tape recorder) including a rotary head via which a digital signal representative of information is recorded on a magnetic tape. During playback, the digital signal is reproduced from the magnetic tape via the rotary head. The speed of the magnetic tape and the rotational speed of the rotary head which occur during normal-speed playback are equal to those occurring in the recording mode of operation of the digital VTR.

In such a digital VTR, during the recording mode of operation, a magnetic tape is driven at a predetermined tape speed while a rotary head is rotated at a predetermined head speed. The predetermined tape speed and the predetermined head speed are fixed. Thus, the predetermined tape speed and the predetermined head speed can not be changed. Any special signal representing the speed of the magnetic tape and the rotational speed of the rotary head is not recorded on the magnetic tape. During a normal-speed playback mode of operation of the digital VTR, the magnetic tape is driven at the predetermined tape speed and the rotary head is rotated at the predetermined head speed as in the recording mode of operation.

A known analog VTR can selectively operate in either a normal time mode or a long time mode. The long time mode of operation can continue to record an information-representing signal on a magnetic tape for an interval equal to three times an interval available in the normal time mode of operation. In the analog VTR, during the recording of an information-representing signal on the magnetic tape, a control pulse signal is recorded on a control track extending along a longitudinal direction of the magnetic tape. The recorded control pulse signal has a period depending on whether the signal recording is implemented by the normal time mode or the long time mode. During playback, the analog VTR reproduces a control pulse signal, and decides whether an information-representing signal is of the type recorded by the normal time mode or the long time mode.

SUMMARY OF THE INVENTION

It is a first object of this invention to provide an apparatus for recording a digital signal at a variable data rate (a variable signal recording rate), and for reproducing the recorded digital signal.

It is a second object of this invention to provide a recording medium on which a digital signal is recorded by such an apparatus.

A first aspect of this invention provides a digital signal recording and reproducing apparatus comprising a plurality of heads; first means for recording a digital signal containing an information signal on a recording medium via heads among the heads while sequentially forming tracks on the recording medium; second means for reproducing the digital signal from the recording medium via heads among the heads; a reproduced signal processing circuit for processing the digital signal reproduced by the second means at a changeable data processing rate to recover the information signal from the digital signal reproduced by the second means; third means for, during the recording by the first means, setting a speed of the heads, a speed of the recording medium, a data rate of the recording, and a number of used heads to changeable values respectively; fourth means for allowing the first means to record the digital signal and a mode signal representative of the values set by the third means on the tracks on the recording medium at approximately a predetermined constant recording wavelength; fifth means for, at a start of the reproducing by the second means, setting the speed of the heads, the speed of the recording medium, the data processing rate, and the number of used heads to predetermined initial values respectively; sixth means for detecting the mode signal in the digital signal reproduced by the second means; seventh means for, after the start of the reproducing by the second means, substantially equalizing the speed of the heads, the speed of the recording medium, and the number of used heads to the respective corresponding values represented by the mode signal detected by the sixth means; and eighth means for, after the start of the reproducing by the second means, controlling the data processing rate at a value substantially corresponding to the value of the data rate of the recording which is represented by the mode signal detected by the sixth means.

A second aspect of this invention provides a digital signal recording and reproducing apparatus comprising a plurality of rotatable heads; first means for recording a digital signal containing an information signal on a recording tape via heads among the heads while sequentially forming slant tracks on the recording tape; second means for reproducing the digital signal from the recording tape via heads among the heads; a reproduced signal processing circuit for processing the digital signal reproduced by the second means at a changeable data processing rate to recover the information signal from the digital signal reproduced by the second means; third means for, during the recording by the first means, setting a rotational speed of the heads, a feed speed of the recording tape, a data rate of the recording, and a number of used heads to changeable values respectively; fourth means for allowing the first means to record the digital signal and a mode signal representative of the values set by the third means on the slant tracks on the recording tape at approximately a predetermined constant recording wavelength; fifth means for, at a start of the reproducing by the second means, setting the rotational speed of the heads, the feed speed of the recording tape, the data processing rate, and the number of used heads to predetermined initial values respectively; sixth means for detecting the mode signal in the digital signal reproduced by the second means; seventh means for, after the start of the reproducing by the second means, substantially equalizing the rotational speed of the heads, the feed speed of the recording tape, and the number of used heads to the respective corresponding values represented by the mode signal detected by the sixth means; and eighth means for, after the start of the reproducing by the second means, controlling the data processing rate at a value substantially corresponding to the value of the data rate of the recording which is represented by the mode signal detected by the sixth means.

A third aspect of this invention is based on the second aspect thereof, and provides a digital signal recording and reproducing apparatus wherein a value "d/(r•n)" remains approximately constant during the recording by the first means, and "d", "r", and "n" denote the rotational speed of the heads, the feed speed of the recording tape, and the number of used heads respectively.

A fourth aspect of this invention is based on the second aspect thereof, and provides a digital signal recording and reproducing apparatus wherein the reproduced signal processing circuit comprises 1) a waveform equalizer for subjecting the digital signal reproduced by the second means to a waveform equalization process in response to a sampling clock signal determining the data processing rate, 2) a detector for converting an output signal of the waveform equalizer into a binary signal, 3) a phase locked loop circuit for reproducing a clock signal from an output signal of the detector, and 4) a discriminator for generating reproduced data from the output signal of the detector in response to the clock signal reproduced by the phase locked loop circuit, and wherein the eighth means comprises a sampling clock generation circuit for controlling a frequency of the sampling clock signal in response to the value of the data rate of the recording which is represented by the mode signal detected by the sixth means.

A fifth aspect of this invention is based on the second aspect thereof, and provides a digital signal recording and reproducing apparatus wherein each of the slant tracks includes a main data area loaded with main information represented by the digital signal, and a subcode data area loaded with the mode signal.

A sixth aspect of this invention provides a digital signal recording and reproducing apparatus comprising a plurality of heads movable relative to a recording disc; first means for recording a digital signal containing an information signal on the recording disc via at least one head among the heads while sequentially forming tracks on the recording disc; second means for reproducing the digital signal from the recording disc via at least one head among the heads; a reproduced signal processing circuit for processing the digital signal reproduced by the second means at a changeable data processing rate to recover the information signal from the digital signal reproduced by the second means; third means for, during the recording by the first means, setting a relative speed between the heads and the recording disc, a data rate of the recording, and a number of used heads to changeable values respectively; fourth means for allowing the first means to record the digital signal and a mode signal representative of the values set by the third means on the tracks on the recording disc at approximately a predetermined constant recording wavelength; fifth means for, at a start of the reproducing by the second means, setting the relative speed between the heads and the recording disc, the data processing rate, and the number of used heads to predetermined initial values respectively; sixth means for detecting the mode signal in the digital signal reproduced by the second means; seventh means for, after the start of the reproducing by the second means, substantially equalizing the relative speed between the heads and the recording disc, and the number of used heads to the respective corresponding values represented by the mode signal detected by the sixth means; and eighth means for, after the start of the reproducing by the second means, controlling the data processing rate at a value substantially corresponding to the value of the data rate of the recording which is represented by the mode signal detected by the sixth means.

A seventh aspect of this invention provides a recording medium having an array of tracks on which a digital signal containing an information signal, and also a mode signal are recorded at approximately a predetermined constant recording wavelength, the mode signal representing a speed related to heads, a recording data rate, and a number of used heads.

An eighth aspect of this invention provides an apparatus comprising a rotatable head; first means for rotating the head at a rotational speed changeable among different rotational speed values; second means for setting the rotational speed of the head to one of the rotational speed values; third means for feeding a recording tape relative to the head at a feed speed changeable among different feed speed values; fourth means for setting the feed speed of the recording tape to one of the feed speed values; fifth means for generating a mode signal representing the rotational speed value set by the second means and the feed speed value set by the fourth means; sixth means for multiplexing the mode signal and an information signal into a composite signal; and seventh means for recording the composite signal on the recording tape via the head.

A ninth aspect of this invention provides an apparatus comprising a rotatable head; first means for rotating the head at a rotational speed changeable among different rotational speed values; second means for feeding a recording tape relative to the head at a feed speed changeable among different feed speed values; third means for reproducing a composite signal from the recording tape via the head; fourth means for demultiplexing the composite signal reproduced by the third means into an information signal and a mode signal, the mode signal representing a desired rotational speed of the head and a desired feed speed of the recording tape; fifth means responsive to the mode signal recovered by the fourth means for setting the rotational speed of the head to one of the rotational speed values which corresponds to the desired rotational speed represented by the mode signal; and sixth means responsive to the mode signal recovered by the fourth means for setting the feed speed of the recording tape to one of the feed speed values which corresponds to the desired feed speed represented by the mode signal.

A tenth aspect of this invention provides an apparatus comprising a rotatable head; first means for rotating the head at a rotational speed changeable among different rotational speed values; second means for setting the rotational speed of the head to one of the rotational speed values during a recording process; third means for feeding a recording tape relative to the head at a feed speed changeable among different feed speed values; fourth means for setting the feed speed of the recording tape to one of the feed speed values during the recording process; fifth means for generating a mode signal representing the rotational speed value set by the second means and the feed speed value set by the fourth means; sixth means for multiplexing the mode signal and an information signal into a composite signal; seventh means for recording the composite signal on the recording tape via the head; eighth means for reproducing the composite signal from the recording tape via the head; ninth means for demultiplexing the composite signal reproduced by the eighth means into the information signal and the mode signal; tenth means responsive to the mode signal recovered by the ninth means for setting the rotational speed of the head to the rotational speed value represented by the mode signal during a playback process; and eleventh means responsive to the mode signal recovered by the ninth means for setting the feed speed of the recording tape to the feed speed value represented by the mode signal during the playback process.

DESCRIPTION OF THE PREFERRED EMBODIMENTS

First Embodiment

Figure 1:
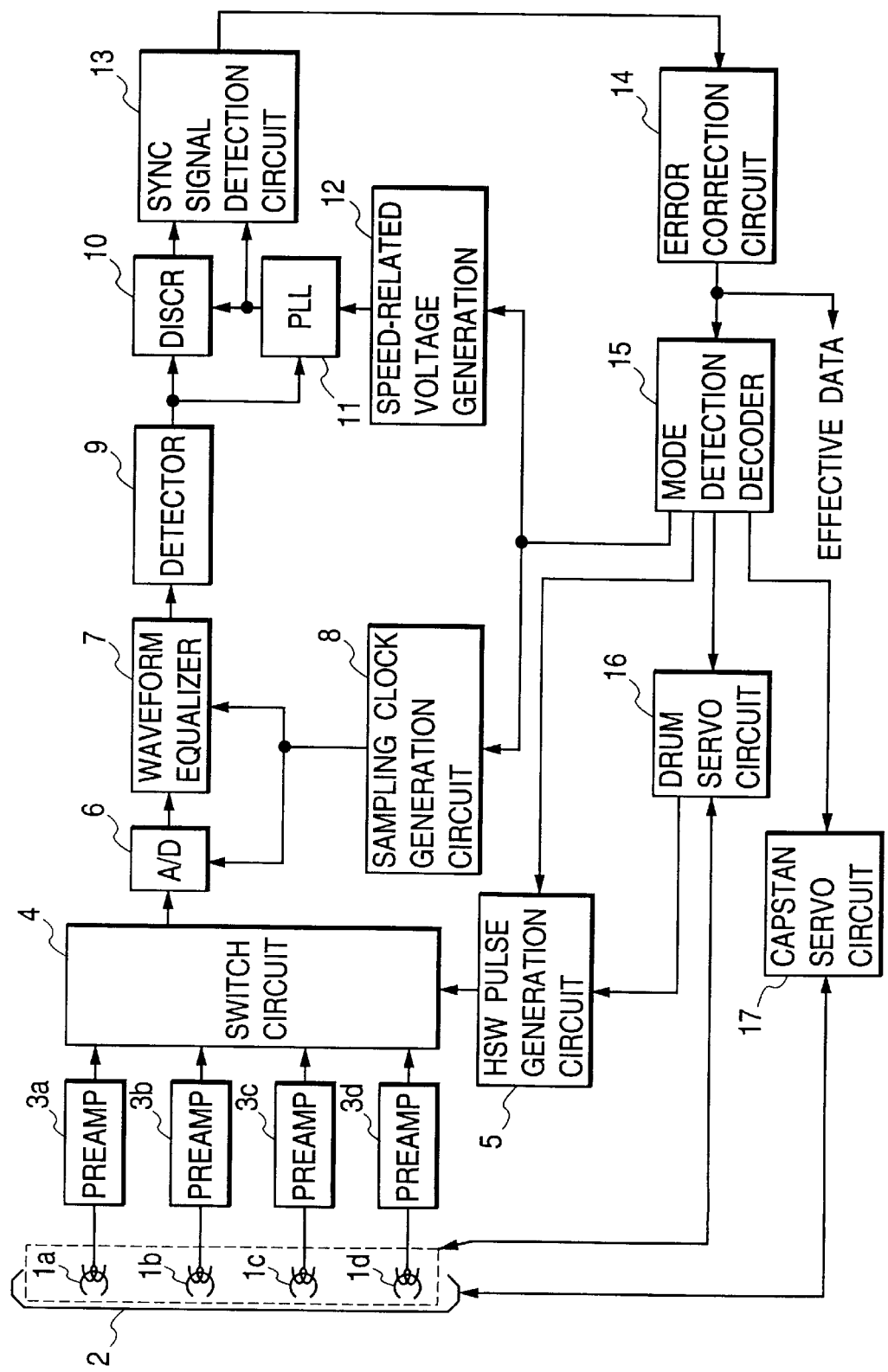
FIG. 1 is a block diagram of a reproducing side of a digital signal recording and reproducing apparatus according to a first embodiment of this invention.

FIG. 1 shows a reproducing side of a digital signal recording and reproducing apparatus according to a first embodiment of this invention.

With reference to FIG. 1, there are four magnetic heads 1a, 1b, 1c, and 1d mounted on a rotary drum (not shown). The magnetic heads 1a, 1b, 1c, and 1d rotate together with the rotary drum. The magnetic heads 1a and 1b are diametrically opposed to each other.

The magnetic head 1a has a first predetermined azimuth angle. The magnetic head 1b has a second predetermined azimuth angle different from the first predetermined azimuth angle. The magnetic heads 1c and 1d are diametrically opposed to each other.

The magnetic head 1c has the second predetermined azimuth angle. The magnetic head 1d has the first predetermined azimuth angle. The magnetic heads 1a and 1c are close to each other, forming a first head pair. The magnetic heads 1b and 1d are close to each other, forming a second head pair diametrically opposed to the first head pair.

A magnetic tape 2 is wrapped around an outer circumferential surface of the rotary drum along a part of a helix through an angular range of about 180 degrees. During a recording mode of operation of the apparatus, a digital information signal is recorded on the magnetic tape 2 data-block by data-block. The recording of the digital information signal is implemented by using a set of the magnetic heads 1a and 1b, or a set of the magnetic heads 1a, 1b, 1c, and 1d.

For example, the digital information signal includes main data, subcode data, and auxiliary data. The main data represents main information. The auxiliary data is divided into packs each having a fixed length. Every pack contains auxiliary information pieces and related identification information pieces. Examples of the auxiliary information pieces are an information piece representing a tape cassette identification number, an information piece corresponding to a time code, an information piece representing a recording date, an information piece representing a signal source, and an information piece corresponding to text data indicating a program title and a program summary.

The magnetic tape 2 is formed with an array of slant tracks on which the main data, the subcode data, and the packs are recorded. Every slant track has an arrangement of equal-size data areas referred to as sync blocks corresponding to data blocks.

Figure 2:
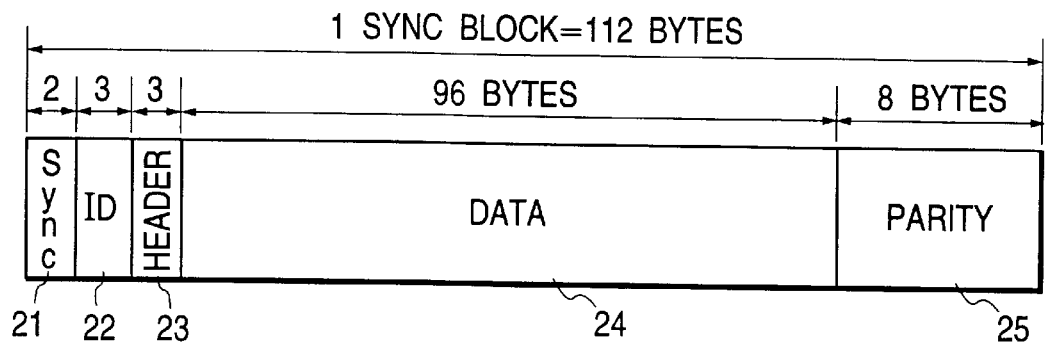
FIG. 2 is a diagram of an example of a format of one sync block.

FIG. 2 shows an example of a format of one sync block. With reference to FIG. 2, one sync block corresponds to 112 bytes in capacity (size), and has a sequence of sub areas 21, 22, 23, 24, and 25. The first sub area 21 has 2 bytes, and stores a sync signal. The second sub area 22 has 3 bytes, and stores address information. The address information is also referred to as the identification (ID) information. The third sub area 23 has 3 bytes, and stores header information. The fourth sub area 24 has 96 bytes, and stores various information pieces. The fourth sub area 24 is referred to as the data storing area or the data storing region. The fifth sub area 25 has 8 bytes, and stores a signal of parities for correcting an error or errors in the information represented by the other sub areas 21–24.

Figure 3:
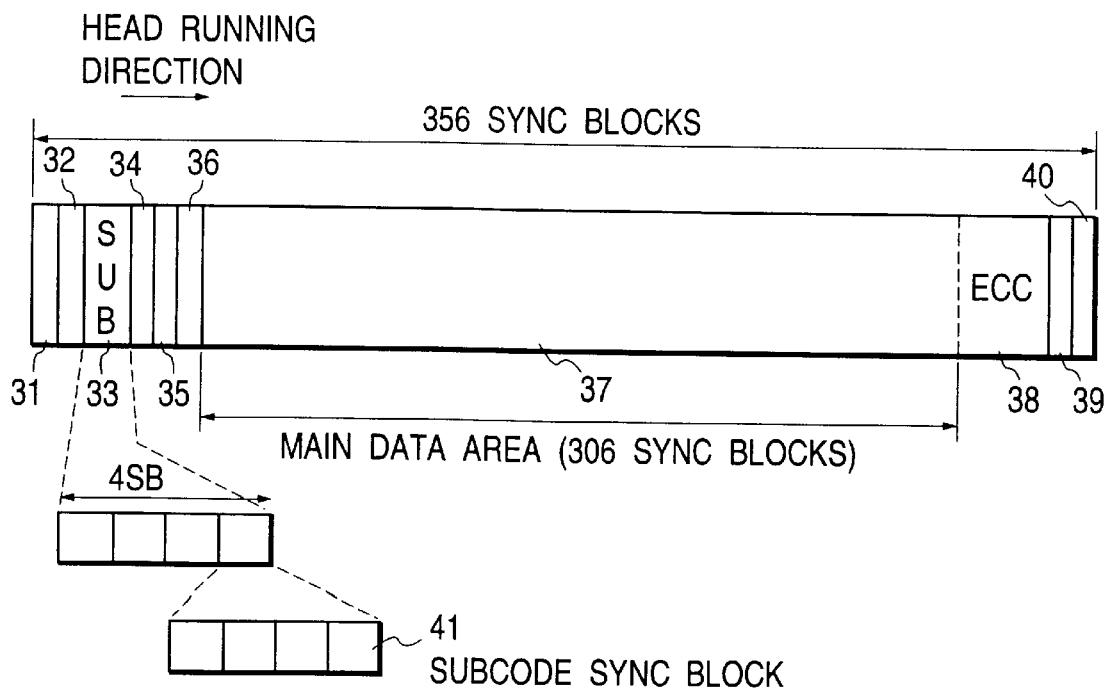
FIG. 3 is a diagram of an example of a format of one slant track on a magnetic tape.

FIG. 3 shows an example of a format of one slant track on the magnetic tape 2. With reference to FIG. 3, one slant track has a sequence of a margin area 31, a preamble area 32, a subcode area 33, a postamble area 34, an IBG area 35, a preamble area 36, a main data area 37, an error correction code (ECC) area 38, a postamble area 39, and a margin area 40. One slant track corresponds to 356 sync blocks. The main data area 37 stores 306 sync blocks representing a digital signal (normal data or special data). The error correction code area 38 stores 30 sync blocks representing an outer error correction code signal (a C2 code signal or an outer code signal). The preamble area 32, the subcode area 33, and the postamble area 34 store preamble data, subcode data, and postamble data respectively. The IBG area 35 stores IBG data providing an inter-block gap between a subcode data zone and a main data zone. The preamble area 36 and the postamble area 39 store preamble data and postamble data respectively.

As shown in FIG. 3, the subcode area 33 has 4 sync blocks corresponding to 448 bytes. Each of the 4 sync blocks in the subcode area 33 is composed of 4 subcode sync blocks 41 each having 28 bytes. One byte is defined as one symbol. Thus, each subcode sync block 41 has 28 symbols.

Figure 4:
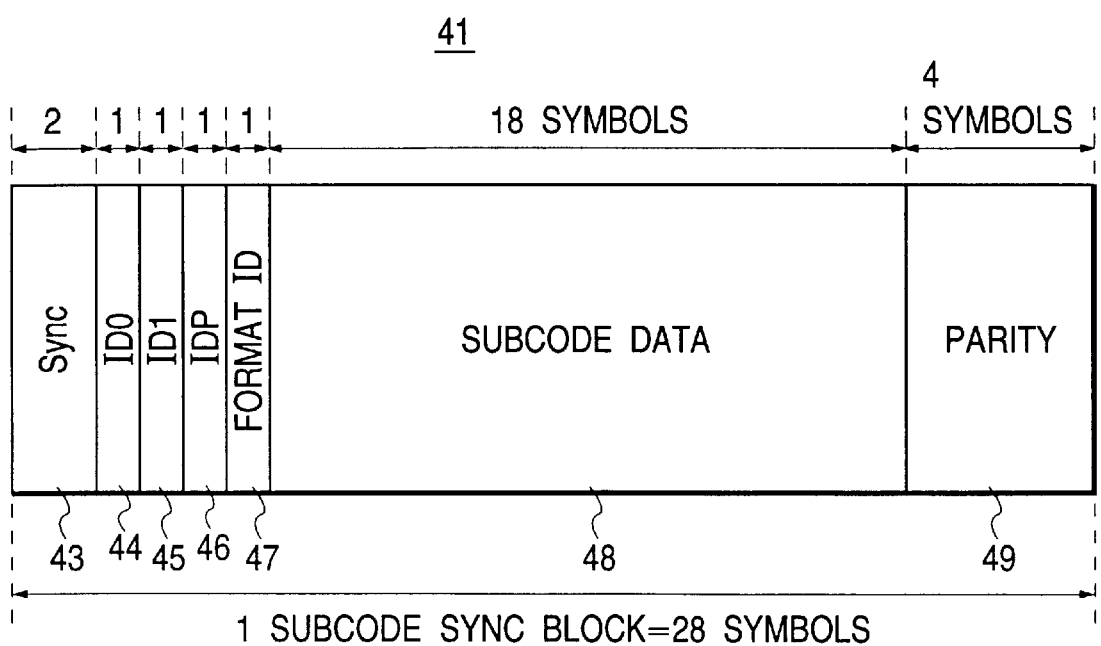
FIG. 4 is a diagram of an example of a format of one subcode sync block.

FIG. 4 shows an example of a format of one subcode sync block 41. With reference to FIG. 4, one subcode sync block 41 has a sequence of sub areas 43, 44, 45, 46, 47, 48, and 49. The first sub area 43 has 2 symbols, and stores a sync signal. The second sub area 44 has 1 symbol, and stores address information ID0. The third sub area 45 has 1 symbol, and stores address information ID1. The fourth sub area 46 has 1 symbol, and stores a signal of parities for detecting an error or errors in the address information ID0 and the address information ID1. The fifth sub area 47 has 1 symbol, and stores format identification information. The sixth sub area 48 has 18 symbols, and stores subcode data. The seventh sub area 49 has 4 symbols, and stores a signal of parities for detecting an error or errors in the information represented by the other sub areas 43–48. The subcode data in the sixth sub area 48 represents auxiliary information pieces such as a title of recorded contents, a recording date, a time, and an absolute address on the magnetic tape 2.

As will be made clear later, a mode information piece representing a combination (r, v, d, n) is recorded on subcode sync blocks 41. Here, "r" denotes the rotational speed (rpm) of the rotary drum, that is, the rotational speed of the magnetic heads 1a, 1b, 1c, and d which occurs during the signal recording. In addition, "v" denotes the feed speed or the running speed (mm/s) of the magnetic tape 2 which occurs during the signal recording. Furthermore, "d" denotes the recording data rate (Mbps), and "n" denotes the number of magnetic heads, among the magnetic heads 1a, 1b, 1c, and 1d, which are used in the signal recording.

The fifth sub area 47 in a subcode sync block 41 is loaded with an information piece representing the block size of an error correction code (ECC) signal recorded on the area 38 (see FIG. 3) in a related slant track, an information piece representing a ECC block number per track, an information piece representing a program number, and an information piece representing the rotational speed of the rotary drum. The fifth sub area 47 in another subcode sync block 41 in the same slant track is loaded with information pieces including an information piece representing the recording mode.

The information piece representing the rotational speed of the rotary drum has 2 bits while the information piece representing the recording mode has 4 bits. The information piece representing the rotational speed of the rotary drum and the information piece representing the recording mode are combined to form a 6-bit mode information piece representing the combination (r, v, d, n). Different states of the 6-bit mode information piece are previously assigned to different combinations (r, v, d, n) respectively. For example, the 6-bit mode information piece being "000000" is assigned to the combination (1800, 16.675, 14.1, 2), and the 6-bit mode information piece being "010000" is assigned to the combination (2250, 33.35, 35.25, 4).

The signal recording is designed so that the wavelength related to a recorded digital signal on the magnetic tape 2 will remain approximately equal to a predetermined constant value. Specifically, the value "d/(r•n)" is set approximately equal to a given value.

The rotary drum speed (the head speed) "r" can be changed among predetermined values including, for example, 1800 rpm and 2250 rpm. The tape speed "v" can be changed among predetermined values including, for example, 16.675 mm/s and 33.35 mm/s. The recording data rate "d" can be changed among predetermined values including, for example, 14.1 Mbps and 35.25 Mbps. The used head number "n" can be changed between 2 and 4. As previously mentioned, the wavelength related to the recorded digital signal on the magnetic tape 2 remains approximately equal to the predetermined constant value. In every slant track, a subcode area 33 preceding a main data area 37 is loaded with a 6-bit mode information piece representing a combination (r, v, d, n).

In the reproducing side of FIG. 1, the magnetic heads 1a, 1b, 1c, and 1d are connected to a switch circuit 4 via rotary transformers and preamplifiers 3a, 3b, 3c, and 3d. The switch circuit 4 is connected to an HSW (head switching) pulse generation circuit 5. A signal processing stage following the switch circuit 4 is divided into first and second portions. The first portion relates to the magnetic heads 1a and 1b while the second portion relates to the magnetic heads 1c and 1d. The first and second portions are similar in structure and function. Accordingly, only the first portion is illustrated in FIG. 1, and will be explained hereinafter.

The switch circuit 4 is successively followed by an A/D converter 6, a waveform equalizer 7, and a detector 9. The A/D converter 6 and the waveform equalizer 7 are connected to a sampling clock generation circuit 8. The detector 9 is connected to a discriminator 10 and a PLL circuit 11. The discriminator 10 is connected to the PLL circuit 11 and a sync signal detection circuit 13. The PLL circuit 11 is connected to the sync signal detection circuit 13. The PLL circuit 11 is also connected to a speed-related voltage generation circuit 12. The sync signal detection circuit 13 is successively followed by an error correction circuit 14 and a mode detection decoder 15. The mode detection decoder 15 is connected to the HSW pulse generation circuit 5, the sampling clock generation circuit 8, the speed-related voltage generation circuit 12, a drum servo circuit 16, and a capstan servo circuit 17. The drum servo circuit 16 controls a drum motor (not shown) for rotating the rotary drum. The drum servo circuit 16 is connected to the HSW pulse generation circuit 5. The capstan servo circuit 17 controls a capstan motor (not shown) for driving the magnetic tape 2.

The reproducing side of FIG. 1 operates as follows. A start of a playback process uses predetermined initial values r1, v1, d1, and n1 for the rotary drum speed "r", the tape speed "v", the recording data rate "d", and the used head number "n", respectively. The initial values r1, v1, d1, and n1 are chosen so that a recorded digital signal related to the predetermined constant recording wavelength can be properly reproduced.

At the start of the playback process, the drum servo circuit 16 controls the drum motor so that the rotary drum will be rotated at the initial speed r1. At the start of the playback process, the capstan servo circuit 17 controls the capstan motor so that the magnetic tape 2 will be driven at the initial speed v1. At the start of the playback process, the HSW pulse generation circuit 5 produces a predetermined initial HSW pulse signal, and feeds the initial HSW pulse signal to the switch circuit 4. The initial HSW pulse signal is designed so that a number of used heads will be equal to the initial number n1.

Accordingly, the magnetic heads 1a, 1b, 1c, and 1d start scanning the magnetic tape 2, and start reproducing an information signal therefrom. Even in the case where the trajectories of the magnetic heads 1a, 1b, 1c, and 1d on the magnetic tap 2 disagree with tracks thereon so that the magnetic heads 1a, 1b, 1c, and 1d scan only portions of the tracks, the magnetic heads 1a, 1b, 1c, and 1d surely meet subcode sync blocks 41 since every track has plural subcode sync blocks 41. Output signals of the magnetic heads 1a, 1b, 1c, and 1d, that is, signals reproduced by the magnetic heads 1a, 1b, 1c, and 1d, are fed to the switch circuit 4 via the rotary transformers and the preamplifiers 3a, 3b, 3c, and 3d. When the initial used head number n1 is equal to "2", the switch circuit 4 alternately and periodically selects one of the reproduced signals related to the magnetic heads 1a and 1b in response to the initial HSW pulse signal. The switch circuit 4 outputs the resultant reproduced signal to the A/D converter 6. When the initial used head number n1 is equal to "4", the switch circuit 4 sequentially and cyclically selects two of the four reproduced signals in response to the initial HSW pulse signal. Specifically, the switch circuit 4 selects the output signals of the preamplifiers 3a and 3c (that is, the output signals of the magnetic heads 1a and 1c) during a first period, and selects the output signals of the preamplifiers 3b and 3d (that is, the output signals of the magnetic heads 1b and 1d) during a second period. Thereby, the switch circuit 4 combines the output signals of the preamplifiers 3a and 3b (that is, the output signals of the magnetic heads 1a and 1b) into a first reproduced signal, and combines the output signals of the preamplifiers 3c and 3d (that is, the output signals of the magnetic heads 1c and 1d) into a second reproduced signal. The switch circuit 4 outputs the first reproduced signal to the A/D converter 6. The switch circuit 4 outputs the second reproduced signal to an A/D converter (not shown) in the second portion of the signal processing stage.

At the start of the playback process, the sampling clock generation circuit 8 produces a predetermined initial sampling clock signal, and feeds the initial sampling clock signal to the A/D converter 6 and the waveform equalizer 7. The A/D converter 6 changes the output signal of the switch circuit 4 into a corresponding digital signal in response to the initial sampling clock signal. The A/D converter 6 outputs the digital signal to the waveform equalizer 7. The waveform equalizer 7 subjects the output signal of the A/D converter 6 to a known waveform equalization process in response to the initial sampling clock signal. The waveform equalizer 7 outputs the resultant signal to the detector 9.

The initial sampling clock signal has a predetermined frequency which is equal to at least twice the upper limit frequency of a recorded information signal, and which is suited to A/D conversion and waveform equalization of an information signal corresponding to the initial recording data rate d1.

The detector 9 compares the output signal of the waveform equalizer 7 with a predetermined threshold value, thereby converting the output signal of the waveform equalizer 7 into a binary signal (a bi-level signal or a bi-value signal). The detector 9 outputs the binary signal to the discriminator 10 and the PLL circuit 11.

The speed-related voltage generation circuit 12 produces a speed-related voltage, and applies the speed-related voltage to the PLL circuit 11. The PLL circuit 11 includes a voltage-controlled oscillator (VCO) which generates a signal having a frequency controlled by the speed-related voltage. At the start of the playback process, the speed-related voltage generation circuit 12 produces a predetermined initial voltage, and applies the initial voltage to the PLL circuit 11. In the PLL circuit 11, the frequency of the signal generated by the VCO is controlled by the initial voltage. The initial voltage is designed so that the PLL circuit 11 can extract a clock signal from an information signal corresponding to the initial recording data rate d1. Accordingly, the PLL circuit 11 extracts a clock signal from the output signal of the detector 9. The extracted clock signal has a period corresponding to one bit of the reproduced signal. Thus, the extracted clock signal is a bit-corresponding clock signal. The PLL circuit 11 outputs the extracted clock signal to the discriminator 10 and the sync signal detection circuit 13 as a reproduced clock signal. The discriminator 10 periodically latches the output signal of the detector 9 in response to the reproduced clock signal, thereby discriminating or detecting data in the output signal of the detector 9. The discriminator 10 outputs the detected data to the sync signal detection circuit 13.

The sync signal detection circuit 13 detects an every sync signal of a known fixed pattern (a predetermined pattern) in the output signal of the discriminator 10. The sync signal detection circuit 13 subjects the output signal of the discriminator 10 to a demodulation process and a deformatting process in response to the detected sync signal. The sync signal detection circuit 13 outputs the resultant data to the error correction circuit 14. The error correction circuit 14 periodically subjects the output signal of the sync signal detection circuit 13 to an error correction process. The error correction process uses error correction code signals in the data outputted from the sync signal detection circuit 13. The error correction circuit 14 outputs the correction-resultant data to the mode detection decoder 15. In addition, the error correction circuit 14 feeds the correction-resultant data to a later-stage processing circuit (not shown) as effective data related to the magnetic heads 1a and 1b.

The mode detection decoder 15 extracts data in every subcode sync block 41 from the output signal of the error correction circuit 14. The mode detection decoder 15 detects every 6-bit mode information piece in the extracted data which represents a combination (r, v, d, n). Thus, the mode detection decoder 15 recovers the information piece of the rotary drum speed (the head speed) "r", the information piece of the tape speed "v", the information piece of the recording data rate "d", and the information piece of the used head number "n".

The mode detection decoder 15 generates a first control signal in response to the information piece of the rotary drum speed "r". The mode detection decoder 15 outputs the first control signal to the drum servo circuit 16. The drum servo circuit 16 controls the drum motor in response to the first control signal so that the rotational speed of the rotary drum will be changed from the initial speed r1 to the rotary drum speed "r" if the initial speed r1 differs from the rotary drum speed "r".

The mode detection decoder 15 generates a second control signal in response to the information piece of the tape speed "v". The mode detection decoder 15 outputs the second control signal to the capstan servo circuit 17. The capstan servo circuit 17 controls the capstan motor in response to the second control signal so that the running speed of the magnetic tape 2 will be changed from the initial speed v1 to the tape speed "v" if the initial speed v1 differs from the tape speed "v".

The mode detection decoder 15 generates a third control signal in response to the information piece of the recording data rate "d". The mode detection decoder 15 outputs the third control signal to the sampling clock generation circuit 8. The sampling clock generation circuit 8 produces a sampling clock signal in response to the third control signal which has a frequency suited to A/D conversion and waveform equalization of a reproduced signal related to the recording data rate "d". The sampling clock generation circuit 8 feeds the produced sampling clock signal to the A/D converter 6 and the waveform equalizer 7. If the initial sampling clock signal does not correspond to the recording data rate "d", the sampling clock signal is updated to the state which matches a reproduced signal related to the recording data rate "d". The A/D converter 6 changes the output signal of the switch circuit 4 into a corresponding digital signal in response to the sampling clock signal. The A/D converter 6 outputs the digital signal to the waveform equalizer 7. The waveform equalizer 7 subjects the output signal of the A/D converter 6 to the known waveform equalization process in response to the sampling clock signal. The waveform equalizer 7 outputs the resultant signal to the detector 9.

Also, the mode detection decoder 15 outputs the third control signal to the speed-related voltage generation circuit 12. The speed-related voltage generation circuit 12 produces a speed-related voltage in response to the third control signal. The speed-related voltage matches a reproduced signal related to the recording data rate "d". The speed-related voltage generation circuit 12 applies the speed-related voltage to the VCO in the PLL circuit 11. In the PLL circuit 11, the frequency of the signal generated by the VCO is controlled by the speed-related voltage. The PLL circuit 11 responds to the speed-related voltage, extracting a clock signal from the output signal of the detector 9. If the initial voltage to the VCO in the PLL circuit 11 does not correspond to the recording data rate "d", the initial voltage is replaced by the speed-related voltage which matches a reproduced signal related to the recording data rate "d".

The mode detection decoder 15 generates a fourth control signal in response to the information piece of the used head number "n". The mode detection decoder 15 outputs the fourth control signal to the HSW pulse generation circuit 5. The HSW pulse generation circuit 5 produces an HSW pulse signal in response to the fourth control signal. The produced HSW pulse signal corresponds to the used head number "n". The HSW pulse generation circuit 5 feeds the HSW pulse signal to the switch circuit 4. The HSW pulse signal enables the number of used heads to be equal to the used head number "n". If the initial head number n1 differs from the used head number "n", the number of used heads is changed from the initial number n1 to the used head number "n".

The drum servo circuit 16 includes a feedback loop for driving and controlling the drum motor at a constant rotational speed and a constant phase. In the drum servo circuit 16, a speed-indicating pulse signal having a frequency depending on the rotational speed of the drum motor is applied to a frequency detection circuit which forms a part of the feedback loop. The frequency detection circuit compares the frequency of the speed-indicating pulse signal with the frequency of a reference signal, generating a speed error signal depending on the error between the frequency of the speed-indicating pulse signal and the frequency of the reference signal. The drum motor is controlled in response to the speed error signal so that the actual rotational speed of the drum motor will be equal to a constant speed prescribed by the reference signal. The drum servo circuit 16 has a section for varying the reference signal in response to the first control signal fed from the mode detection decoder 15. The first control signal may be directly used as the reference signal.

The drum servo circuit 16 also has a section for generating a signal depending on the rotation of the rotary drum or the angular position of the rotary drum. The drum servo circuit 16 outputs the generated signal to the HSW pulse generation circuit 5. The HSW pulse generation circuit 5 adjusts the HSW pulse signal in response to the output signal of the drum servo circuit 16 so that the signal selection process (the head selection process) implemented by the switch circuit 4 will be in a suitable timing relation with the rotation of the rotary drum.

The capstan servo circuit 17 includes a feedback loop for driving and controlling the capstan motor at a constant rotational speed and a constant phase. In the capstan servo circuit 17, a speed-indicating pulse signal having a frequency depending on the rotational speed of the capstan motor is applied to a frequency detection circuit which forms a part of the feedback loop. The frequency detection circuit compares the frequency of the speed-indicating pulse signal with the frequency of a reference signal, generating a speed error signal depending on the error between the frequency of the speed-indicating pulse signal and the frequency of the reference signal. The capstan motor is controlled in response to the speed error signal so that the actual rotational speed of the capstan motor will be equal to a constant speed prescribed by the reference signal. The capstan servo circuit 17 has a section for varying the reference signal in response to the second control signal fed from the mode detection decoder 15. The second control signal may be directly used as the reference signal.

Figure 5:
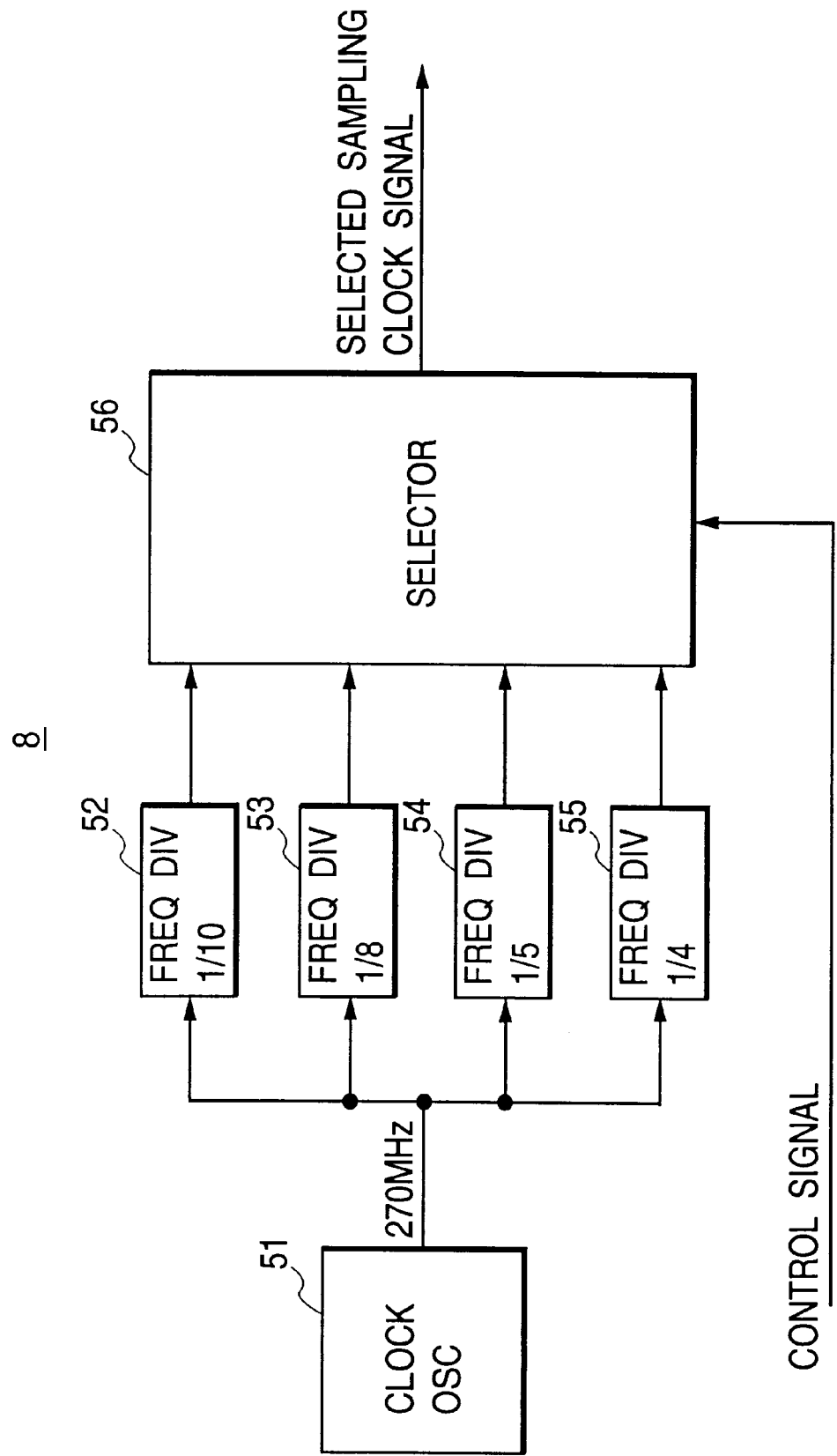
FIG. 5 is a block diagram of a sampling clock generation circuit in FIG. 1.

As shown in FIG. 5, the sampling clock generation circuit 8 includes a clock oscillator 51, frequency dividers 52, 53, 54, and 55, and a selector 56. The clock oscillator 51 outputs a clock pulse signal to the frequency dividers 52, 53, 54, and 55. The clock pulse signal has a predetermined frequency equal to, for example, 270 MHz. The device 52 divides the frequency of the clock pulse signal by 10. The device 53 divides the frequency of the clock pulse signal by 8. The device 54 divides the frequency of the clock pulse signal by 5. The device 55 divides the frequency of the clock pulse signal by 4. When the frequency of the clock pulse signal is equal to 270 MHz, the frequencies of the output signals of the frequency dividers 52, 53, 54, and 55 are equal to 27 MHz, 33.75 MHz, 54 MHz, and 67.5 MHz respectively. The selector 56 receives the output signals of the frequency dividers 52, 53, 54, and 55, and selects one from among the output signals of the frequency dividers 52, 53, 54, and 55 in response to the third control signal fed from the mode detection decoder 15 (see FIG. 1). The selector 56 outputs the selected signal to the A/D converter 6 (see FIG. 1) and the waveform equalizer 7 (see FIG. 1) as a sampling clock signal.

For example, the 27-MHz signal is used as a sampling clock signal when the rotary drum is rotated at a speed of 1800 rpm. In this case, the 33.75-MHz signal, the 54-MHz signal, and the 67.5-MHz signal correspond to a rotary drum speed of 2250 rpm, a rotary drum speed of 3600 rpm, and a rotary drum speed of 4500 rpm respectively.

As understood from the previous explanation, the immediately after the initial stage of the playback process, the rotary drum speed (the head speed), the tape speed, and the used head number can be made into agreement with those used during the signal recording. In addition, the sampling clock generation circuit 8 and the speed-related voltage generation circuit 12 can be controlled into correspondence with the recording data rate.

Second Embodiment

A second embodiment of this invention is similar to the first embodiment thereof except for design changes explained hereinafter.

According to the second embodiment of this invention, operation of a digital signal recording and reproducing apparatus can be changed among three different modes, that is, a mode "1", a mode "2", and a mode "3".

When the apparatus operates in the mode "1", the rotary drum speed (the head speed) "r" is equal to 1800 rpm and the tape speed "v" is equal to 16.67 mm/s. In addition, the recording data rate "d" is equal to 19.13856 Mbps, and the used head number "n" is equal to 2. In this case, the value "d/(r•n)" is approximately equal to 5316.3.

When the apparatus operates in the mode "2", the rotary drum speed (the head speed) "r" is equal to 2250 rpm and the tape speed "v" is equal to 41.68 mm/s. In addition, the recording data rate "d" is equal to 47.84640 Mbps, and the used head number "n" is equal to 4. In this case, the value "d/(r•n)" is approximately equal to 5316.3.

When the apparatus operates in the mode "3", the rotary drum speed (the head speed) "r" is equal to 4500 rpm and the tape speed "v" is equal to 83.36 mm/s. In addition, the recording data rate "d" is equal to 95.69280 Mbps, and the used head number "n" is equal to 4. In this case, the value "d/(r•n)" is approximately equal to 5316.3.

During the recording operation of the apparatus in the mode "3", 300 (4500/60 by 4) tracks are formed on the magnetic tape 2 per second. As shown in FIG. 3, every track has 356 sync blocks. Here, the 356 sync blocks correspond to 356 by 112 by 8 bits. Therefore, during the recording operation of the apparatus in the mode "3", the recording data rate is equal to 95.69280 (356 by 112 by 8 by 300/106) Mbps.

The frequency of the sampling clock signal is set to, for example, 27 MHz during operation of the apparatus in the mode "1". The frequency of the sampling clock signal is set to, for example, 33.75 MHz during operation of the apparatus in the mode "2". The frequency of the sampling clock signal is set to, for example, 54 MHz or 67.5 MHz during operation of the apparatus in the mode "3".

The value "d/(r•n)" remains approximately equal to 5316.3 regardless of whether the apparatus operates in the mode "1", the mode "2", or the mode "3". The rotary drum speed "r" and the tape speed "v" have predetermined relations with each other when operation of the apparatus is in the mode "1", the mode "2", and the mode "3" respectively.

The fifth sub area 47 in every subcode sync block 41 contains format identification information which has a 2-bit piece used as an indication of the rotational speed of the rotary drum. The 2-bit piece is referred to as the 2-bit mode information piece. Three different states are previously assigned to the mode "1", the mode "2", and the mode "3" respectively. For example, the 2-bit mode information piece being "00" is assigned to the mode "1". The 2-bit mode information piece being "01" is assigned to the mode "2". The 2-bit mode information piece being "10" is assigned to the mode "3".

At a start of the playback process, the apparatus is operated in the mode "1". During the start of the playback process, a 2-bit mode information piece is detected by the mode detection decoder When the detected 2-bit mode information piece is "10" representing the mode "3", the mode detection decoder 15 controls the drum servo circuit 16 so that the rotary drum speed will be changed to 4500 rpm corresponding to the mode "3". In addition, the mode detection decoder 15 controls the capstan servo circuit 17 so that the tape speed will be changed to 83.36 mm/s corresponding to the mode "3". Furthermore, the mode detection decoder 15 controls the HSW pulse generation circuit 5 so that the used head number will be changed to 4 corresponding to the mode "3". Also, the mode detection decoder 15 controls the sampling clock generation circuit 8 so that the frequency of the sampling clock signal will be changed to 67.5 MHz corresponding to the mode "3". In addition, the mode detection decoder 15 controls the speed-related voltage generation circuit 12 so that the speed-related voltage will be changed into correspondence with the mode "3".

Third Embodiment

A third embodiment of this invention is similar to the first embodiment thereof except for design changed explained hereinafter.

Figure 6:
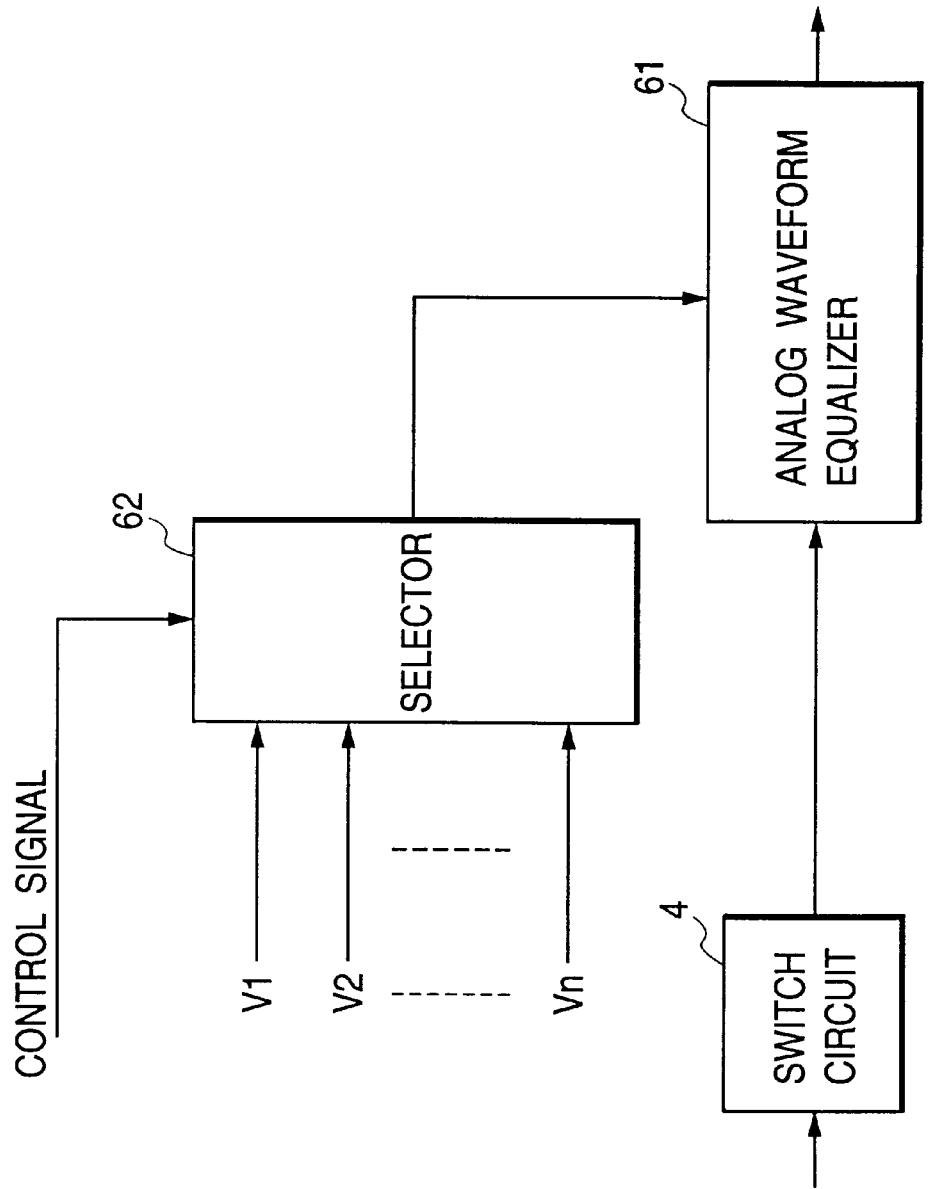
FIG. 6 is a block diagram of a portion of a digital signal recording and reproducing apparatus according to a third embodiment of this invention.

With reference to FIG. 6, the third embodiment includes a selector 62 and an analog waveform equalizer 61 which replace the A/D converter 6, the waveform equalizer 7, and the sampling clock generation circuit 8 (see FIG. 1). The analog waveform equalizer 61 is of an electronic filter type. The analog waveform equalizer 61 is connected between the switch circuit 4 and the detector 9 (see FIG. 1). The selector 62 is connected to the analog waveform equalizer 61. The selector 62 is also connected to the mode detection decoder 15 (see FIG. 1).

The selector 62 receives different predetermined voltages V1, V2, . . . , Vn from voltage sources (not shown). The selector 62 receives a control signal from the mode detection decoder 15 (see FIG. 1). The device 62 selects one from among the predetermined voltages V1, V2, . . . , Vn in response to the control signal. The selector 62 feeds the selected voltage to the analog waveform equalizer 61 as a control voltage.

The analog waveform equalizer 61 receives the output signal of the switch circuit 4. The analog waveform equalizer 61 subjects the output signal of the switch circuit 4 to a waveform equalization process having a characteristic depending on the control voltage. The analog waveform equalizer 61 outputs the resultant signal to the detector 9 (see FIG. 1).

When the mode detection decoder 15 (see FIG. 1) detects a 225 bit mode information piece, the mode detection decoder 15 controls the selector 62 in response to the recording data rate "d" represented by the detected 2-bit mode information piece. Therefore, the device 62 selects one from among the predetermined voltages V1, V2, . . . , Vn which corresponds to the recording data rate "d". The selector 62 feeds the selected voltage to the analog waveform equalizer 61 as the control voltage. The analog waveform equalizer 61 subjects the output signal of the switch circuit 4 to the waveform equalization process having a characteristic suited to a reproduced signal related to the recording data rate "d".

Fourth Embodiment

A fourth embodiment of this invention is similar to the first embodiment thereof except that a recording disc replaces the magnetic tape 2. Examples of the recording disc are an optical recording disc and a magnetic recording disc. The fourth embodiment uses a relative speed between a head and the recording disc instead of the rotary drum speed and the tape speed. The relative speed between the head and the recording disc can be changed among different speeds assigned to respective modes of operation of a digital signal recording and reproducing apparatus. During the recording operation of the apparatus in any of the modes, a digital signal is recorded on the recording disc while a recording wavelength remains constant.

Fifth Embodiment

A fifth embodiment of this invention is similar to the first embodiment thereof except that the clock signal generated by the PLL circuit 11 is used as a sampling clock signal fed to the A/D converter 6 and the waveform equalizer 7. The sampling clock generation circuit 8 is omitted from the fifth embodiment.

Sixth Embodiment

Figure 7:
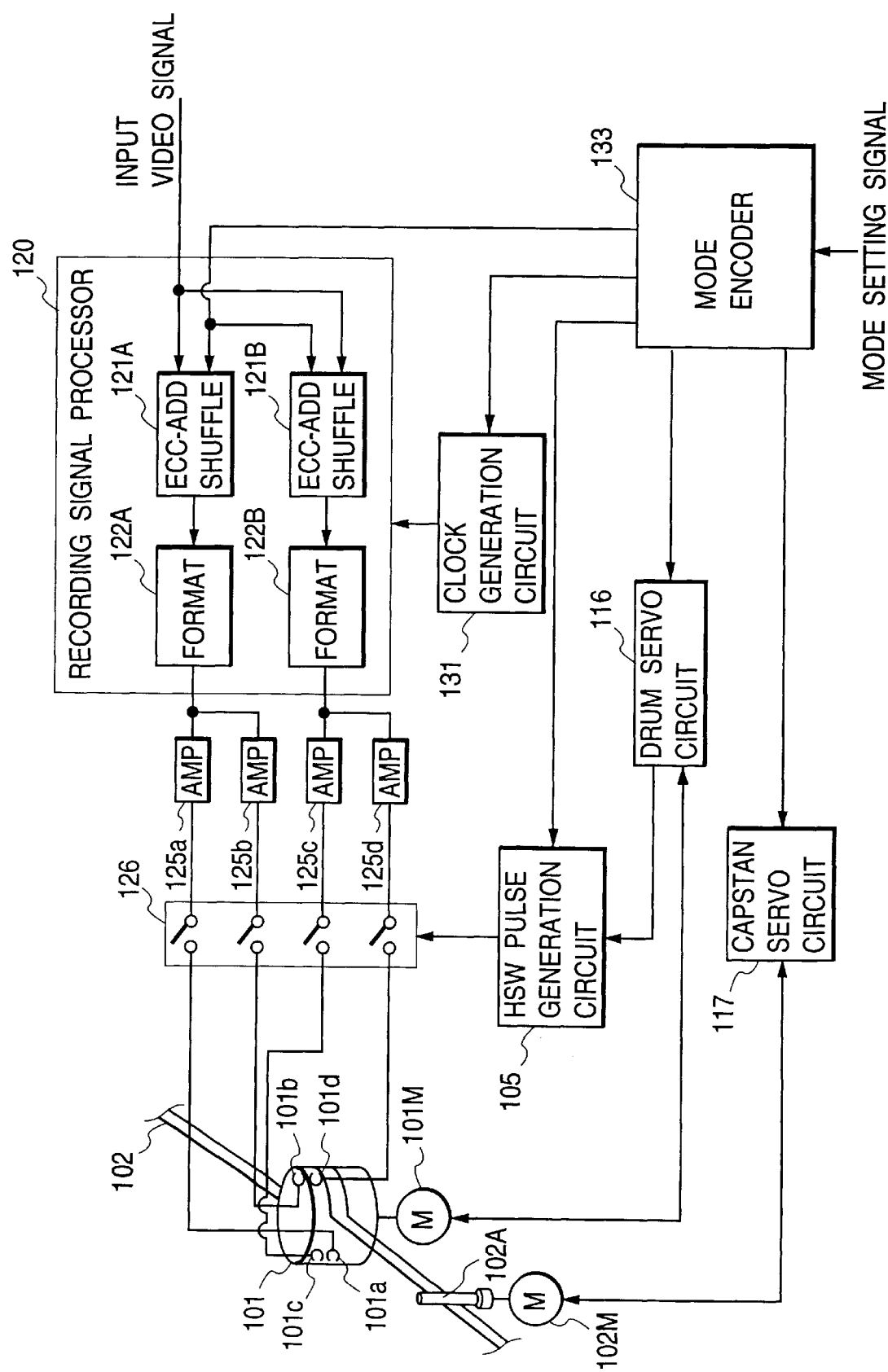
FIG. 7 is a block diagram of a recording side of a digital signal recording and reproducing apparatus according to a sixth embodiment of this invention.

FIG. 7 shows a recording side of a digital signal recording and reproducing apparatus according to a sixth embodiment of this invention.

With reference to FIG. 7, there are four magnetic heads 101a, 101b, 101c, and 101d mounted on a rotary drum 101. The magnetic heads 101a, 101b, 101c, and 101d rotate together with the rotary drum 101. The rotary drum 101 is driven by a drum motor 101M. The magnetic heads 101a and 101b are diametrically opposed to each other. The magnetic head 101a has a first predetermined azimuth angle. The magnetic head 101b has a second predetermined azimuth angle different from the first predetermined azimuth angle. The magnetic heads 101c and 101d are diametrically opposed to each other. The magnetic head 101c has the second predetermined azimuth angle. The magnetic head 101d has the first predetermined azimuth angle. The magnetic heads 101a and 101c are close to each other, forming a first head pair. The magnetic heads 101b and 101d are close to each other, forming a second head pair diametrically opposed to the first head pair.

A magnetic tape 102 is wrapped around an outer circumferential surface of the rotary drum 101 along a part of a helix through an angular range of about 180 degrees. The magnetic tape 102 is fed with respect to the rotary drum 101 by a capstan 102A. The capstan 102A is driven by a capstan motor 102M. A digital information signal is recorded on the magnetic tape 102 data-block by data-block. The recording of the digital information signal is implemented by using a set of the magnetic heads 101a and 101b, or a set of the magnetic heads 101a, 101b, 101c, and 101d.

The recording side of FIG. 7 includes a recording signal processor 120 receiving an input digital video signal. The recording signal processor 120 includes ECC-adding (error correction code adding) and shuffling circuits 121A and 121B, and formatting circuits 122A and 122B. The ECC-adding and shuffling circuits 121A and 121B receive the input digital video signal. The formatting circuits 122A and 122B follow the ECC-adding and shuffling circuits 121A and 121B, respectively.

The recording side of FIG. 7 includes recording amplifiers 125a, 125b, 125c, and 125d. The recording amplifiers 125a and 125b follow the formatting circuit 122A in the recording signal processor 120. The recording amplifiers 125c and 125d follow the formatting circuit 122B in the recording signal processor 120.

The output terminal of the recording amplifier 125a is connected to the magnetic head 101a via a switch circuit 126 and a rotary transformer (not shown). The output terminal of the recording amplifier 125b is connected to the magnetic head 101b via the switch circuit 126 and a rotary transformer (not shown). The output terminal of the recording amplifier 125c is connected to the magnetic head 101c via the switch circuit 126 and a rotary transformer (not shown). The output terminal of the recording amplifier 125d is connected to the magnetic head 101d via the switch circuit 126 and a rotary transformer (not shown).

The recording side of FIG. 7 includes an HSW (head switching) pulse generation circuit 105, a drum servo circuit 116, a capstan servo circuit 117, a clock generation circuit 131, and a mode encoder 133. The HSW pulse generation circuit 105 is connected to the switch circuit 126, the drum servo circuit 116, and the mode encoder 133. The drum servo circuit 116 is connected to the drum motor 101M and the mode encoder 133. The capstan servo circuit 117 is connected to the capstan motor 102M and the mode encoder 133. The clock generation circuit 131 is connected to the recording signal processor 120 and the mode encoder 133. The mode encoder 133 is connected to the recording signal processor 120.

The digital information signal which is recorded on the magnetic tape 102 includes main data, subcode data, and auxiliary data. The main data represents main information. The auxiliary data is divided into packs each having a fixed length. Every pack contains auxiliary information pieces and related identification information pieces. Examples of the auxiliary information pieces are an information piece representing a tape cassette identification number, an information piece corresponding to a time code, an information piece representing a recording date, an information piece representing a signal source, and an information piece corresponding to text data indicating a program title and a program summary.

The magnetic tape 102 is formed with an array of slant tracks on which the main data, the subcode data, and the packs are recorded. Every slant track has an arrangement of equal-size data areas referred to as sync blocks corresponding to data blocks. Every sync block is of a predetermined format shown in FIG. 2. Every slant track on the magnetic tape 102 is of a predetermined format shown in FIG. 3. Every slant track has a subcode area 33 composed of 4 subcode sync blocks 41 (see FIG. 3). Every subcode sync block 41 is of a predetermined format shown in FIG. 4.

A mode information piece representing a combination (r, v, d, n) is recorded on subcode sync blocks 41 as in the first embodiment of this invention. Here, "r" denotes the rotational speed (rpm) of the rotary drum 101, that is, the rotational speed of the magnetic heads 101a, 101b, 101c, and 101d which occurs during the signal recording. In addition, "v" denotes the feed speed or the running speed (mm/s) of the magnetic tape 102 which occurs during the signal recording. Furthermore, "d" denotes the recording data rate (Mbps), and "n" denotes the number of magnetic heads, among the magnetic heads 101a, 101b, 101c, and 101d, which are used in the signal recording.

Different states of the mode information piece are previously assigned to different combinations (r, v, d, n) respectively. For example, a first predetermined state of the mode information piece is assigned to the combination (1800, 30, 20, 2) which corresponds to a predetermined mode 0. A second predetermined state of the mode information piece is assigned to the combination (1800, 60, 40, 4) which corresponds to a predetermined mode ②. A third predetermined state of the mode information piece is assigned to the combination (3600, 120, 80, 4) which corresponds to a predetermined mode ②.

The signal recording is designed so that the wavelength related to a recorded digital signal on the magnetic tape 102 will remain approximately equal to a predetermined constant value. Specifically, the value "d/(r•n)" is set approximately equal to a given value.

The rotary drum speed (the head speed) "r" can be changed among predetermined values including 1800 rpm and 3600 rpm. The tape speed "v" can be changed among predetermined values including 30 mm/s, 60 mm/s, and 120 mm/s. The recording data rate "d" can be changed among predetermined values including 20 Mbps, 40 Mbps, and 80 Mbps. The used head number "n" can be changed between "2" and "4". As previously mentioned, the wavelength related to the recorded digital signal on the magnetic tape 102 remains approximately equal to the predetermined constant value. In every slant track, a subcode area 33 preceding a main data area 37 is loaded with a mode information piece representing a combination (r, v, d, n).

Operation of the recording side of FIG. 7 can be changed among different modes including the predetermined mode ⓪, the predetermined mode ②, and the predetermined mode ③. The mode encoder 133 receives a mode setting signal representing a desired mode of operation of the recording side of FIG. 7. For example, the mode setting signal is generated via a manual switch (not shown).

The mode encoder 133 encodes the mode setting signal into a mode information signal representing a combination (r, v, d, n). When the desired mode represented by the mode setting signal agrees with the predetermined mode ⓪, the combination (r, v, d, n) represented by the mode information signal is equal to the combination (1800, 30, 20, 2). When the desired mode represented by the mode setting signal agrees with the predetermined mode ②, the combination (r, v, d, n) represented by the mode information signal is equal to the combination (1800, 60, 40, 4). When the desired mode represented by the mode setting signal agrees with the predetermined mode ③, the combination (r, v, d, n) represented by the mode information signal is equal to the combination (3600, 120, 80, 4). The mode encoder 133 outputs the mode information signal to the recording signal processor 120.

The mode encoder 133 converts the mode setting signal into a first control signal representing a desired rotary drum speed. When the desired mode represented by the mode setting signal agrees with the predetermined mode ①, the desired rotary drum speed represented by the first control signal is equal to 1800 rpm. When the desired mode represented by the mode setting signal agrees with the predetermined mode ②, the desired rotary drum speed represented by the first control signal is equal to 1800 rpm. When the desired mode represented by the mode setting signal agrees with the predetermined mode ③, the desired rotary drum speed represented by the first control signal is equal to 3600 rpm. The mode encoder 133 outputs the first control signal to the drum servo circuit 116. The drum servo circuit 116 controls the drum motor 101M in response to the first control signal so that the rotational speed of the rotary drum 101 will be equal to the desired rotary drum speed represented by the first control signal.

The mode encoder 133 converts the mode setting signal into a second control signal representing a desired tape speed. When the desired mode represented by the mode setting signal agrees with the predetermined mode ①, the desired tape speed represented by the second control signal is equal to 30 mm/s. When the desired mode represented by the mode setting signal agrees with the predetermined mode ②, the desired tape speed represented by the second control signal is equal to 60 mm/s. When the desired mode represented by the mode setting signal agrees with the predetermined mode ③, the desired tape speed represented by the second control signal is equal to 120 mm/s. The mode encoder 133 outputs the second control signal to the capstan servo circuit 117. The capstan servo circuit 117 controls the capstan motor 102M in response to the second control signal so that the running speed of the magnetic tape 102 will be equal to the desired tape speed represented by the second control signal.

The mode encoder 133 converts the mode setting signal into a third control signal representing a desired clock signal frequency. When the desired mode represented by the mode setting signal agrees with the predetermined mode ①, the desired clock signal frequency represented by the third control signal is equal to a value corresponding to a data rate of 20 Mbps. When the desired mode represented by the mode setting signal agrees with the predetermined mode ②, the desired clock signal frequency represented by the third control signal is equal to a value corresponding to a data rate of 20 Mbps. When the desired mode represented by the mode setting signal agrees with the predetermined mode ③, the desired clock signal frequency represented by the third control signal is equal to a value corresponding to a data rate of 40 mbps. The mode encoder 133 outputs the third control signal to the clock generation circuit 131. The clock generation circuit 131 produces, in response to the third control signal, a clock signal which has a frequency equal to the desired clock signal frequency represented by the third control signal. The clock generation circuit 131 outputs the produced clock signal to the recording signal processor 120.

The mode encoder 133 converts the mode setting signal into a fourth control signal representing a desired used head number. When the desired mode represented by the mode setting signal agrees with the predetermined mode ②, the desired used head number represented by the fourth control signal is equal to "2". When the desired mode represented by the mode setting signal agrees with the predetermined mode ②, the desired used head number represented by the fourth control signal is equal to "4". When the desired mode represented by the mode setting signal agrees with the predetermined mode ③, the desired used head number represented by the fourth control signal is equal to "4". The mode encoder 133 outputs the fourth control signal to the HSW pulse generation circuit 105. The HSW pulse generation circuit 105 produces an HSW pulse signal in response to the fourth control signal. The produced HSW pulse signal corresponds to the desired used head number represented by the fourth control signal. The HSW pulse generation circuit 105 feeds the HSW pulse signal to the switch circuit 126. The HSW pulse signal enables the number of used heads to be equal to the desired used head number represented by the fourth control signal.

For example, the mode encoder 133 includes a ROM provided with tables representing the relations among the mode setting signal, the mode information signal, the first control signal, the second control signal, the third control signal, and the fourth control signal. In this case, the mode encoder 133 implements table look-up procedures to generate the mode information signal, the first control signal, the second control signal, the third control signal, and the fourth control signal from the mode setting signal.

The drum servo circuit 116 includes a feedback loop for driving and controlling the drum motor 101M at a constant rotational speed and a constant phase. In the drum servo circuit 116, a speed-indicating pulse signal having a frequency depending on the rotational speed of the drum motor is applied to a frequency detection circuit which forms a part of the feedback loop. The frequency detection circuit compares the frequency of the speed-indicating pulse signal with the frequency of a reference signal, generating a speed error signal depending on the error between the frequency of the speed-indicating pulse signal and the frequency of the reference signal. The drum motor 101M is controlled in response to the speed error signal so that the actual rotational speed of the drum motor 101M will be equal to a constant speed prescribed by the reference signal. The drum servo circuit 116 has a section for varying the reference signal in response to the first control signal fed from the mode encoder 133. The first control signal may be directly used as the reference signal.

The drum servo circuit 116 also has a section for generating a signal depending on the rotation of the rotary drum 101 or the angular position of the rotary drum 101. The drum servo circuit 116 outputs the generated signal to the HSW pulse generation circuit 105. The HSW pulse generation circuit 105 adjusts the HSW pulse signal in response to the output signal of the drum servo circuit 116 so that the signal selection process (the head selection process) implemented by the switch circuit 126 will be in a suitable timing relation with the rotation of the rotary drum 101.

The capstan servo circuit 117 includes a feedback loop for driving and controlling the capstan motor 102M at a constant rotational speed and a constant phase. In the capstan servo circuit 117, a speed-indicating pulse signal having a frequency depending on the rotational speed of the capstan motor 102M is applied to a frequency detection circuit which forms a part of the feedback loop. The frequency detection circuit compares the frequency of the speed-indicating pulse signal with the frequency of a reference signal, generating a speed error signal depending on the error between the frequency of the speed-indicating pulse signal and the frequency of the reference signal. The capstan motor 102M is controlled in response to the speed error signal so that the actual rotational speed of the capstan motor 102M will be equal to a constant speed prescribed by the reference signal. The capstan servo circuit 117 has a section for varying the reference signal in response to the second control signal fed from the mode encoder 133. The second control signal may be directly used as the reference signal.

The recording signal processor 120 receives the mode information signal from the mode encoder 133. When the combination (r, v, d, n) represented by the mode information signal corresponds to the predetermined mode ①, the recording signal processor 120 activates the ECC-adding and shuffling circuit 121A and the formatting circuit 122A and deactivates the ECC-adding and shuffling circuit 121B and the formatting circuit 122B. When the combination (r, v, d, n) represented by the mode information signal corresponds to the predetermined mode ②, the recording signal processor 120 activates all the ECC-adding and shuffling circuits 121A and 121B and the formatting circuits 122A and 122B. When the combination (r, v, d, n) represented by the mode information signal corresponds to the predetermined mode ③, the recording signal processor 120 activates all the ECC-adding and shuffling circuits 121A and 121B and the formatting circuits 122A and 122B.

In the case where the desired mode represented by the mode setting signal agrees with the predetermined mode ①, the recording side of FIG. 7 operates as follows. In this case, the combination (r, v, d, n) represented by the mode information signal corresponds to the predetermined mode ① so that the ECC-adding and shuffling circuit 121A and the formatting circuit 122A are activated while the ECC-adding and shuffling circuit 121B and the formatting circuit 122B are deactivated. As previously indicated, the ECC-adding and shuffling circuit 121A receives the input digital video signal. The ECC-adding and shuffling circuit 121A subjects the input digital video signal to an ECC-adding process and a shuffling process in response to the clock signal fed from the clock generation circuit 131. In addition, the ECC-adding and shuffling circuit 121A receives the mode information signal from the mode encoder 133. The ECC-adding and shuffling circuit 121A periodically adds the mode information signal to the input digital video signal in response to the clock signal fed from the clock generation circuit 131. Every addition of the mode information signal provides a mode information piece recorded on the subcode area 33 of a slant track on the magnetic tape 102. Furthermore, the ECC-adding and shuffling circuit 121A adds subcode data and auxiliary data to the input digital video signal. The ECC-adding and shuffling circuit 121A outputs the resultant digital video signal to the formatting circuit 122A. The formatting circuit 122A subjects the output signal of the ECC-adding and shuffling circuit 121A to a formatting process and a modulation process. Specifically, the formatting circuit 122A adds a sync signal and an ID signal to every unit of the output signal of the ECC-adding and shuffling circuit 121A to complete a sync block. Thereby, the formatting circuit 122A converts the output signal of the ECC-adding and shuffling circuit 121A into a corresponding data sequence. In addition, the formatting circuit 122A subjects the data sequence to modulation (encoding) for record on the magnetic tape 102. The formatting circuit 122A operates in response to the clock signal fed from the clock generation circuit 131. The formatting circuit 122A outputs the modulation-resultant signal to the recording amplifiers 125a and 125b. The recording amplifier 125a enlarges the output signal of the formatting circuit 122A. The recording amplifier 125a outputs the resultant signal to the switch circuit 126. The recording amplifier 125b enlarges the output signal of the formatting circuit 122A. The recording amplifier 125b outputs the resultant signal to the switch circuit 126.

In the case where the desired mode represented by the mode setting signal agrees with the predetermined mode ①, the switch circuit 126 periodically connects and disconnects the recording amplifier 125a to and from the magnetic head 101a in response to the HSW pulse signal outputted by the HSW pulse generation circuit 105. Furthermore, the switch circuit 126 periodically connects and disconnects the recording amplifier 125b to and from the magnetic head 101b in response to the HSW pulse signal outputted by the HSW pulse generation circuit 105. Generally, the recording amplifier 125a is connected to the magnetic head 101a when the recording amplifier 125b is disconnected from the magnetic head 101b. In addition, the recording amplifier 125a is disconnected from the magnetic head 101a when the recording amplifier 125b is connected to the magnetic head 101b. On the other hand, the switch circuit 126 continues to disconnect the recording amplifiers 125c and 125d from the magnetic heads 101c and 101d. Accordingly, only the magnetic heads 101a and 101b are used, and the number of used magnetic heads is equal to "2". The output signal of the recording amplifier 125a is transmitted to the magnetic head 101a via the switch circuit 126 and the rotary transformer (not shown). The output signal of the recording amplifier 125a is recorded on the magnetic tape 102 by the magnetic head 101a. The output signal of the recording amplifier 125b is transmitted to the magnetic head 101b via the switch circuit 126 and the rotary transformer (not shown). The output signal of the recording amplifier 125b is recorded on the magnetic tape 102 by the magnetic head 101b.

In the case where the desired mode represented by the mode setting signal agrees with the predetermined mode ①, the frequency of the clock signal outputted from the clock generation circuit 131 is equal to a value (20 MHz) corresponding to a data rate of 20 Mbps. In addition, the rotary drum 101 is rotated at a speed of 1800 rpm while the magnetic tape 102 is fed at a speed of 30 mm/S.

In the case where the desired mode represented by the mode setting signal agrees with the predetermined mode ②, the recording side of FIG. 7 operates as follows. In this case, the combination (r, v, d, n) represented by the mode information signal corresponds to the predetermined mode ② so that all the ECC-adding and shuffling circuits 121A and 121B and the formatting circuits 122A and 122B are activated. As previously indicated, the ECC-adding and shuffling circuits 121A and 121B receive the input digital video signal. The ECC-adding and shuffling circuit 121A periodically accepts and rejects the input digital video signal in response to the clock signal fed from the clock generation circuit 131. Also, the ECC-adding and shuffling circuit 121B periodically accepts and rejects the input digital video signal in response to the clock signal fed from the clock generation circuit 131. When one of the ECC-adding and shuffling circuits 121A and 121B accepts the input digital video signal, the other rejects the input video signal. Accordingly, the ECC-adding and shuffling circuits 121A and 121B divide the input digital video signal into first and second digital video signals, and accept the first and second digital video signals respectively. The ECC-adding and shuffling circuit 121A subjects the first digital video signal to an ECC-adding process and a shuffling process in response to the clock signal fed from the clock generation circuit 131. In addition, the ECC-adding and shuffling circuit 121A receives the mode information signal from the mode encoder 133. The ECC-adding and shuffling circuit 121A periodically adds the mode information signal to the first digital video signal in response to the clock signal fed from the clock generation circuit 131. Every addition of the mode information signal provides a mode information piece recorded on the subcode area 33 of a slant track on the magnetic tape 102. Furthermore, the ECC-adding and shuffling circuit 121A adds subcode data and auxiliary data to the first digital video signal. The ECC-adding and shuffling circuit 121A outputs the resultant digital video signal to the formatting circuit 122A. On the other hand, the ECC-adding and shuffling circuit 121B subjects the second digital video signal to an ECC-adding process and a shuffling process in response to the clock signal fed from the clock generation circuit 131. In addition, the ECC-adding and shuffling circuit 121B receives the mode information signal from the mode encoder 133. The ECC-adding and shuffling circuit 121B periodically adds the mode information signal to the second digital video signal in response to the clock signal fed from the clock generation circuit 131. Every addition of the mode information signal provides a mode information piece recorded on the subcode area 33 of a slant track on the magnetic tape 102. Furthermore, the ECC-adding and shuffling circuit 121B adds subcode data and auxiliary data to the second digital signal. The ECC-adding and shuffling circuit 121B outputs the resultant digital video signal to the formatting circuit 122B.

In the case where the desired mode represented by the mode setting signal agrees with the predetermined mode ②, the formatting circuit 122A subjects the output signal of the ECC-adding and shuffling circuit 121A to a formatting process and a modulation process. Specifically, the formatting circuit 122A adds a sync signal and an ID signal to every unit of the output signal of the ECC-adding and shuffling circuit 121A to complete a sync block. Thereby, the formatting circuit 122A converts the output signal of the ECC-adding and shuffling circuit 121A into a corresponding data sequence. In addition, the formatting circuit 122A subjects the data sequence to modulation (encoding) for record on the magnetic tape 102. The formatting circuit 122A operates in response to the clock signal fed from the clock generation circuit 131. The formatting circuit 122A outputs the modulation-resultant signal to the recording amplifiers 125a and 125b. The recording amplifier 125a enlarges the output signal of the formatting circuit 122A. The recording amplifier 125a outputs the resultant signal to the switch circuit 126. The recording amplifier 125b enlarges the output signal of the formatting circuit 122A. The recording amplifier 125b outputs the resultant signal to the switch circuit 126. On the other hand, the formatting circuit 122B subjects the output signal of the ECC-adding and shuffling circuit 121B to a formatting process and a modulation process. Specifically, the formatting circuit 122B adds a sync signal and an ID signal to every unit of the output signal of the ECC-adding and shuffling circuit 121B to complete a sync block. Thereby, the formatting circuit 122B converts the output signal of the ECC-adding and shuffling circuit 121B into a corresponding data sequence. In addition, the formatting circuit 122B subjects the data sequence to modulation (encoding) for record on the magnetic tape 102. The formatting circuit 122B operates in response to the clock signal fed from the clock generation circuit 131. The formatting circuit 122B outputs the modulation-resultant signal to the recording amplifiers 125c and 125d. The recording amplifier 125c enlarges the output signal of the formatting circuit 122B. The recording amplifier 125c outputs the resultant signal to the switch circuit 126. The recording amplifier 125d enlarges the output signal of the formatting circuit 122B. The recording amplifier 125d outputs the resultant signal to the switch circuit 126.

In the case where the desired mode represented by the mode setting signal agrees with the predetermined mode ②, the switch circuit 126 periodically connects and disconnects the recording amplifier 125a to and from the magnetic head 101a in response to the HSW pulse signal outputted by the HSW pulse generation circuit 105. Furthermore, the switch circuit 126 periodically connects and disconnects the recording amplifier 125b to and from the magnetic head 101b in response to the HSW pulse signal outputted by the HSW pulse generation circuit 105. Also, the switch circuit 126 periodically connects and disconnects the recording amplifier 125c to and from the magnetic head 101c in response to the HSW pulse signal outputted by the HSW pulse generation circuit 105. In addition, the switch circuit 126 periodically connects and disconnects the recording amplifier 125d to and from the magnetic head 101d in response to the HSW pulse signal outputted by the HSW pulse generation circuit 105. Generally, the recording amplifiers 125a and 125c are connected to the magnetic heads 101a and 101c respectively when the recording amplifiers 125b and 125d are disconnected from the magnetic heads 101b and 101d respectively. In addition, the recording amplifiers 125a and 125c are disconnected from the magnetic heads 101a and 101c respectively when the recording amplifiers 125b and 125d are connected to the magnetic heads 101b and 101d respectively. Accordingly, all the magnetic heads 101a, 101b, 101c, and 101d are used, and the number of used magnetic heads is equal to "4". The output signal of the recording amplifier 125a is transmitted to the magnetic head 101a via the switch circuit 126 and the rotary transformer (not shown). The output signal of the recording amplifier 125a is recorded on the magnetic tape 102 by the magnetic head 101a. The output signal of the recording amplifier 125b is transmitted to the magnetic head 101b via the switch circuit 126 and the rotary transformer (not shown). The output signal of the recording amplifier 125b is recorded on the magnetic tape 102 by the magnetic head 101b. The output signal of the recording amplifier 125c is transmitted to the magnetic head 101c via the switch circuit 126 and the rotary transformer (not shown). The output signal of the recording amplifier 125c is recorded on the magnetic tape 102 by the magnetic head 101c. The output signal of the recording amplifier 125d is transmitted to the magnetic head 101d via the switch circuit 126 and the rotary transformer (not shown). The output signal of the recording amplifier 125d is recorded on the magnetic tape 102 by the magnetic head 101d.

In the case where the desired mode represented by the mode setting signal agrees with the predetermined mode ②, the frequency of the clock signal outputted from the clock generation circuit 131 is equal to a value (20 MHz) corresponding to a data rate of 20 Mbps. Since each of the output signals of the formatting circuits 122A and 122B has a data rate of 20 Mbps and both the output signals of the formatting circuits 122A and 122B are simultaneously recorded on the magnetic tape 102, the resultant recording data rate is equal to 40 mbps. The rotary drum 101 is rotated at a speed of 1800 rpm while the magnetic tape 102 is fed at a speed of 60 mm/s.

In the case where the desired mode represented by the mode setting signal agrees with the predetermined mode ③, the recording side of FIG. 7 operates as follows. In this case, the combination (r, v, d, n) represented by the mode information signal corresponds to the predetermined mode ③ so that all the ECC-adding and shuffling circuits 121A and 121B and the formatting circuits 122A and 122B are activated. As previously indicated, the ECC-adding and shuffling circuits 121A and 121B receive the input digital video signal. The ECC-adding and shuffling circuit 121A periodically accepts and rejects the input digital video signal in response to the clock signal fed from the clock generation circuit 131. Also, the ECC-adding and shuffling circuit 121B periodically accepts and rejects the input digital video signal in response to the clock signal fed from the clock generation circuit 131. When one of the ECC-adding and shuffling circuits 121A and 121B accepts the input digital video signal, the other rejects the input video signal. Accordingly, the ECC-adding and shuffling circuits 121A and 121B divide the input digital video signal into first and second digital video signals, and accept the first and second digital video signals respectively. The ECC-adding and shuffling circuit 121A subjects the first digital video signal to an ECC-adding process and a shuffling process in response to the clock signal fed from the clock generation circuit 131. In addition, the ECC-adding and shuffling circuit 121A receives the mode information signal from the mode encoder 133. The ECC-adding and shuffling circuit 121A periodically adds the mode information signal to the first digital video signal in response to the clock signal fed from the clock generation circuit 131. Every addition of the mode information signal provides a mode information piece recorded on the subcode area 33 of a slant track on the magnetic tape 102. Furthermore, the ECC-adding and shuffling circuit 121A adds subcode data and auxiliary data to the first digital video signal. The ECC-adding and shuffling circuit 121A outputs the resultant digital video signal to the formatting circuit 122A. On the other hand, the ECC-adding and shuffling circuit 121B subjects the second digital video signal to an ECC-adding process and a shuffling process in response to the clock signal fed from the clock generation circuit 131. In addition, the ECC-adding and shuffling circuit 121B receives the mode information signal from the mode encoder 133. The ECC-adding and shuffling circuit 121B periodically adds the mode information signal to the second digital video signal in response to the clock signal fed from the clock generation circuit 131. Every addition of the mode information signal provides a mode information piece recorded on the subcode area 33 of a slant track on the magnetic tape 102. Furthermore, the ECC-adding and shuffling circuit 121B adds subcode data and auxiliary data to the second digital video signal. The ECC-adding and shuffling circuit 121B outputs the resultant digital video signal to the formatting circuit 122B.

In the case where the desired mode represented by the mode setting signal agrees with the predetermined mode ③, the formatting circuit 122A subjects the output signal of the ECC-adding and shuffling circuit 121A to a formatting process and a modulation process. Specifically, the formatting circuit 122A adds a sync signal and an ID signal to every unit of the output signal of the ECC-adding and shuffling circuit 121A to complete a sync block. Thereby, the formatting circuit 122A converts the output signal of the ECC-adding and shuffling circuit 121A into a corresponding data sequence. In addition, the formatting circuit 122A subjects the data sequence to modulation (encoding) for record on the magnetic tape 102. The formatting circuit 122A operates in response to the clock signal fed from the clock generation circuit 131. The formatting circuit 122A outputs the modulation-resultant signal to the recording amplifiers 125a and 125b. The recording amplifier 125a enlarges the output signal of the formatting circuit 122A. The recording amplifier 125a outputs the resultant signal to the switch circuit 126. The recording amplifier 125b enlarges the output signal of the formatting circuit 122A. The recording amplifier 125b outputs the resultant signal to the switch circuit 126. On the other hand, the formatting circuit 122B subjects the output signal of the ECC-adding and shuffling circuit 121B to a formatting process and a modulation process. Specifically, the formatting circuit 122B adds a sync signal and an ID signal to every unit of the output signal of the ECC-adding and shuffling circuit 121B to complete a sync block. Thereby, the formatting circuit 122B converts the output signal of the ECC-adding and shuffling circuit 121B into a corresponding data sequence. In addition, the formatting circuit 122B subjects the data sequence to modulation (encoding) for record on the magnetic tape 102. The formatting circuit 122B operates in response to the clock signal fed from the clock generation circuit 131. The formatting circuit 122B outputs the modulation-resultant signal to the recording amplifiers 125c and 125d. The recording amplifier 125c enlarges the output signal of the formatting circuit 122B. The recording amplifier 125c outputs the resultant signal to the switch circuit 126. The recording amplifier 125d enlarges the output signal of the formatting circuit 122B. The recording amplifier 125d outputs the resultant signal to the switch circuit 126.

In the case where the desired mode represented by the mode setting signal agrees with the predetermined mode ③, the switch circuit 126 periodically connects and disconnects the recording amplifier 125a to and from the magnetic head 101a in response to the HSW pulse signal outputted by the HSW pulse generation circuit 105. Furthermore, the switch circuit 126 periodically connects and disconnects the recording amplifier 125b to and from the magnetic head 101b in response to the HSW pulse signal outputted by the HSW pulse generation circuit 105. Also, the switch circuit 126 periodically connects and disconnects the recording amplifier 125c to and from the magnetic head 101c in response to the HSW pulse signal outputted by the HSW pulse generation circuit 105. In addition, the switch circuit 126 periodically connects and disconnects the recording amplifier 125d to and from the magnetic head 101d in response to the HSW pulse signal outputted by the HSW pulse generation circuit 105. Generally, the recording amplifiers 125a and 125c are connected to the magnetic heads 101a and 101c respectively when the recording amplifiers 125b and 125d are disconnected from the magnetic heads 101b and 101d respectively. In addition, the recording amplifiers 125a and 125c are disconnected from the magnetic heads 101a and 101c respectively when the recording amplifiers 125b and 125d are connected to the magnetic heads 101b and 101d respectively. Accordingly, all the magnetic heads 101a, 101b, 101c, and 101d are used, and the number of used magnetic heads is equal to "4". The output signal of the recording amplifier 125a is transmitted to the magnetic head 101a via the switch circuit 126 and the rotary transformer (not shown). The output signal of the recording amplifier 125a is recorded on the magnetic tape 102 by the magnetic head 101a. The output signal of the recording amplifier 125b is transmitted to the magnetic head 101b via the switch circuit 126 and the rotary transformer (not shown). The output signal of the recording amplifier 125b is recorded on the magnetic tape 102 by the magnetic head 101b. The output signal of the recording amplifier 125c is transmitted to the magnetic head 101c via the switch circuit 126 and the rotary transformer (not shown). The output signal of the recording amplifier 125c is recorded on the magnetic tape 102 by the magnetic head 101c. The output signal of the recording amplifier 125d is transmitted to the magnetic head 101d via the switch circuit 126 and the rotary transformer (not shown). The output signal of the recording amplifier 125d is recorded on the magnetic tape 102 by the magnetic head 101d.

In the case where the desired mode represented by the mode setting signal agrees with the predetermined mode ③, the frequency of the clock signal outputted from the clock generation circuit 131 is equal to a value (40 mHz) corresponding to a data rate of 40 mbps. Since each of the output signals of the formatting circuits 122A and 122B has a data rate of 40 mbps and both the output signals of the formatting circuits 122A and 122B are simultaneously recorded on the magnetic tape 102, the resultant recording data rate is equal to 80 Mbps. The rotary drum 101 is rotated at a speed of 3600 rpm while the magnetic tape 102 is fed at a speed of 120 mm/s.

As understood from the above explanation, operation of the recording side of FIG. 7 can be changed among first, second, and third modes in response to the mode setting signal fed to the mode encoder 133. The first mode corresponds to the predetermined mode ①. The second mode corresponds to the predetermined mode ②. The third mode corresponds to the predetermined mode ③.

Figure 8:
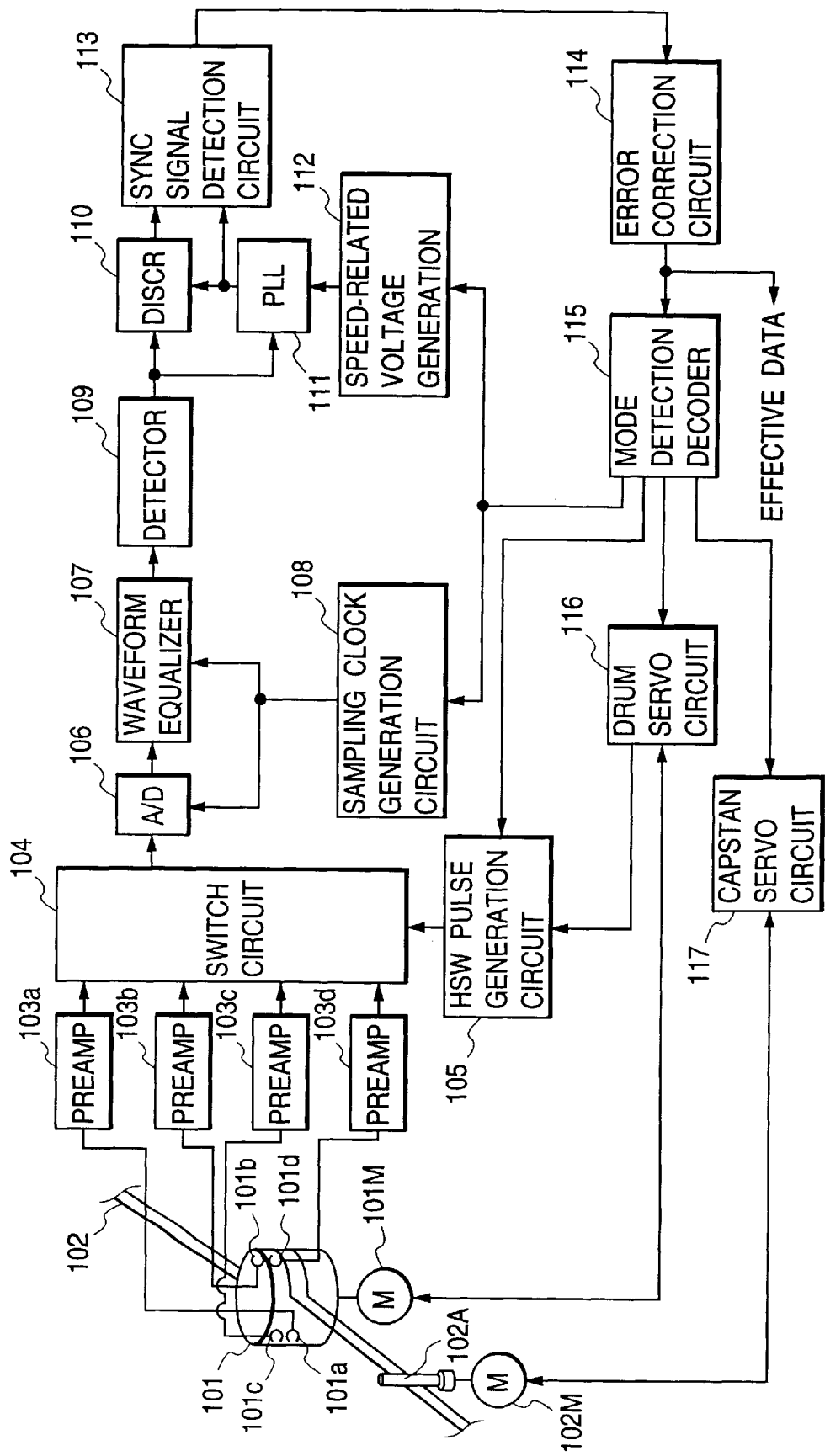
FIG. 8 is a block diagram of a reproducing side of the digital signal recording and reproducing apparatus according to the sixth embodiment of this invention.

FIG. 8 shows a reproducing side of the digital signal recording and reproducing apparatus according to the sixth embodiment of this invention. The reproducing side of FIG. 8 operates on a magnetic tape 102 on which a digital video signal (an information signal) has been recorded along slant tracks by the recording side of FIG. 7 or a recording apparatus similar to the recording side of FIG. 7. Accordingly, in every slant track on the magnetic tape 102, a subcode area 33 preceding a main data area 37 is loaded with a mode information piece representing a combination (r, v, d, n).

In the reproducing side of FIG. 8, the magnetic heads 101a, 101b, 101c, and 101d are connected to a switch circuit 104 via rotary transformers and preamplifiers 103a, 103b, 103c, and 103d. The switch circuit 104 is connected to the HSW pulse generation circuit 105. A signal processing state following the switch circuit 104 is divided into first and second portions. The first portion relates to the magnetic heads 101a and 101b while the second portion relates to the magnetic heads 101c and 101d. The first and second portions are similar in structure and function. Accordingly, only the first portion is illustrated in FIG. 8, and will be explained hereinafter.

The switch circuit 104 is successively followed by an A/D converter 106, a waveform equalizer 107, and a detector 109. The A/D converter 106 and the waveform equalizer 107 are connected to a sampling clock generation circuit 108. The detector 109 is connected to a discriminator 110 and a PLL circuit 111. The discriminator 110 is connected to the PLL circuit 111 and a sync signal detection circuit 113. The PLL circuit 111 is connected to the sync signal detection circuit 113. The PLL circuit 111 is also connected to a speed-related voltage generation circuit 112. The sync signal detection circuit 113 is successively followed by an error correction circuit 114 and a mode detection decoder 115. The mode detection decoder 115 is connected to the HSW pulse generation circuit 105, the sampling clock generation circuit 108, the speed-related voltage generation circuit 112, the drum servo circuit 116, and the capstan servo circuit 117. The drum servo circuit 116 controls the drum motor 101M for rotating the rotary drum 101. The drum servo circuit 116 is connected to the HSW pulse generation circuit 105. The capstan servo circuit 117 controls the capstan motor 102M for driving the magnetic tape 102.

The reproducing side of FIG. 8 operates as follows. A start of a playback process uses predetermined initial values r1, v1, d1, and n1 for the rotary drum speed "r", the tape speed "v", the recording data rate "d", and the used head number "n", respectively. The initial values r1, v1, d1, and n1 are chosen so that a recorded digital signal related to the predetermined constant recording wavelength can be properly reproduced.

At the start of the playback process, the drum servo circuit 116 controls the drum motor 101M so that the rotary drum 101 will be rotated at the initial speed r1. At the start of the playback process, the capstan servo circuit 117 controls the capstan motor 102M so that the magnetic tape 102 will be driven at the initial speed v1. At the start of the playback process, the HSW pulse generation circuit 105 produces a predetermined initial HSW pulse signal, and feeds the initial HSW pulse signal to the switch circuit 104. The initial HSW pulse signal is designed so that a number of used heads will be equal to the initial number n1.

Accordingly, the magnetic heads 101a, 101b, 101c, and 101d start scanning the magnetic tape 102, and start reproducing an information signal (a digital video signal) therefrom. Even in the case where the trajectories of the magnetic heads 101a, 101b, 101c, and 101d on the magnetic tap 102 disagree with tracks thereon so that the magnetic heads 101a, 101b, 101c, and 101d scan only portions of the tracks, the magnetic heads 101a, 101b, 101c, and 101d surely meet subcode sync blocks 41 since every track has plural subcode sync blocks 41. Output signals of the magnetic heads 101a, 101b, 101c, and 101d, that is, signals reproduced by the magnetic heads 101a, 101b, 101c, and 101d, are fed to the switch circuit 104 via the rotary transformers and the preamplifiers 103a, 103b, 103c, and 103d. When the initial used head number n1 is equal to "2", the switch circuit 104 alternately and periodically selects one of the reproduced signals related to the magnetic heads 101a and 101b in response to the initial HSW pulse signal. The switch circuit 104 outputs the resultant reproduced signal to the A/D converter 106. When the initial used head number n1 is equal to "4", the switch circuit 104 sequentially and cyclically selects two of the four reproduced signals in response to the initial HSW pulse signal. Specifically, the switch circuit 104 selects the output signals of the preamplifiers 103a and 103c (that is, the output signals of the magnetic heads 101a and 101c) during a first period, and selects the output signals of the preamplifiers 103b and 103d (that is, the output signals of the magnetic heads 101b and 101d) during a second period. Thereby, the switch circuit 104 combines the output signals of the preamplifiers 103a and 103b (that is, the output signals of the magnetic heads 101a and 101b) into a first reproduced signal, and combines the output signals of the preamplifiers 103c and 103d (that is, the output signals of the magnetic heads 101c and 101d) into a second reproduced signal. The switch circuit 104 outputs the first reproduced signal to the A/D converter 6. The switch circuit 104 outputs the second reproduced signal to an A/D converter (not shown) in the second portion of the signal processing stage.

At the start of the playback process, the sampling clock generation circuit 108 produces a predetermined initial sampling clock signal, and feeds the initial sampling clock signal to the A/D converter 106 and the waveform equalizer 107. The A/D converter 106 changes the output signal of the switch circuit 104 into a corresponding digital signal in response to the initial sampling clock signal. The A/D converter 106 outputs the digital signal to the waveform equalizer 107. The waveform equalizer 107 subjects the output signal of the A/D converter 106 to a known waveform equalization process in response to the initial sampling clock signal. The waveform equalizer 107 outputs the resultant signal to the detector 109. The initial sampling clock signal has a predetermined frequency which is equal to at least twice the upper limit frequency of a recorded information signal, and which is suited to A/D conversion and waveform equalization of an information signal corresponding to the initial recording data rate d1.

The detector 109 compares the output signal of the waveform equalizer 107 with a predetermined threshold value, thereby converting the output signal of the waveform equalizer 107 into a binary signal (a bi-level signal or a bi-value signal). The detector 109 outputs the binary signal to the discriminator 110 and the PLL circuit 111.

The speed-related voltage generation circuit 112 produces a speed-related voltage, and applies the speed-related voltage to the PLL circuit 111. The PLL circuit 111 includes a voltage-controlled oscillator (VCO) which generates a signal having a frequency controlled by the speed-related voltage. At the start of the playback process, the speed-related voltage generation circuit 112 produces a predetermined initial voltage, and applies the initial voltage to the PLL circuit 111. In the PLL circuit 111, the frequency of the signal generated by the VCO is controlled by the initial voltage. The initial voltage is designed so that the PLL circuit 111 can extract a clock signal from an information signal corresponding to the initial recording data rate d1. Accordingly, the PLL circuit 111 extracts a clock signal from the output signal of the detector 109. The extracted clock signal has a period corresponding to one bit of the reproduced signal. Thus, the extracted clock signal is a bit-corresponding clock signal. The PLL circuit 111 outputs the extracted clock signal to the discriminator 110 and the sync signal detection circuit 113 as a reproduced clock signal. The discriminator 110 periodically latches the output signal of the detector 109 in response to the reproduced clock signal, thereby discriminating or detecting data in the output signal of the detector 109. The discriminator 110 outputs the detected data to the sync signal detection circuit 113.

The sync signal detection circuit 113 detects every sync signal of a known fixed pattern (a predetermined pattern) in the output signal of the discriminator 110. The sync signal detection circuit 113 subjects the output signal of the discriminator 110 to a demodulation process and a deformatting process in response to the detected sync signal. The sync signal detection circuit 113 outputs the resultant data to the error correction circuit 114. The error correction circuit 114 periodically subjects the output signal of the sync signal detection circuit 113 to an error correction process. The error correction process uses error correction code signals in the data outputted from the sync signal detection circuit 113. The error correction circuit 114 outputs the correction-resultant data to the mode detection decoder 115. In addition, the error correction circuit 114 feeds the correction-resultant data to a later-stage processing circuit (not shown) as effective data related to the magnetic heads 101a and 101b.

The mode detection decoder 115 extracts data in every subcode sync block 41 from the output signal of the error correction circuit 114. The mode detection decoder 115 detects every mode information piece in the extracted data which represents a combination (r, v, d, n). Thus, the mode detection decoder 115 recovers the information piece of the rotary drum speed (the head speed) "r", the information piece of the tape speed "v", the information piece of the recording data rate "d", and the information piece of the used head number "n".

The mode detection decoder 115 generates a first control signal in response to the information piece of the rotary drum speed "r". The mode detection decoder 115 outputs the first control signal to the drum servo circuit 116. The drum servo circuit 116 controls the drum motor 101M in response to the first control signal so that the rotational speed of the rotary drum 101 will be changed from the initial speed r1 to the rotary drum speed "r" if the initial speed r1 differs from the rotary drum speed "r". When the first control signal corresponds to the predetermined mode ②, the rotary drum speed "r" is set to 1800 rpm. When the first control signal corresponds to the predetermined mode ③, the rotary drum speed "r" is set to 1800 rpm. When the first control signal corresponds to the predetermined mode ③, the rotary drum speed "r" is set to 3600 rpm.

The mode detection decoder 115 generates a second control signal in response to the information piece of the tape speed "v". The mode detection decoder 115 outputs the second control signal to the capstan servo circuit 117. The capstan servo circuit 117 controls the capstan motor 102M in response to the second control signal so that the running speed of the magnetic tape 102 will be changed from the initial speed v1 to the tape speed "v" if the initial speed v1 differs from the tape speed "v". When the second control signal corresponds to the predetermined mode ①, the tape speed "v" is set to 30 mm/s. When the second control signal corresponds to the predetermined mode ②, the tape speed "v" is set to 60 mm/s. When the second control signal corresponds to the predetermined mode ③, the tape speed "v" is set to 120 mm/s. The mode detection decoder 115 generates a third control signal in response to the information piece of the recording data rate "d". The mode detection decoder 115 outputs the third control signal to the sampling clock generation circuit 108. The sampling clock generation circuit 108 produces a sampling clock signal in response to the third control signal which has a frequency suited to A/D conversion and waveform equalization of a reproduced signal related to the recording data rate "d". The sampling clock generation circuit 108 feeds the produced sampling clock signal to the A/D converter 106 and the waveform equalizer 107. If the initial sampling clock signal does not correspond to the recording data rate "d", the sampling clock signal is updated to the state which matches a reproduced signal related to the recording data rate "d". The A/D converter 106 changes the output signal of the switch circuit 104 into a corresponding digital signal in response to the sampling clock signal. The A/D converter 106 outputs the digital signal to the waveform equalizer 107. The waveform equalizer 107 subjects the output signal of the A/D converter 106 to the known waveform equalization process in response to the sampling clock signal. The waveform equalizer 107 outputs the resultant signal to the detector 109.

The sampling clock generation circuit 108 is designed so that the frequency of the generated sampling clock signal can be changed in response to the third control signal outputted from the mode detection decoder 115. Specifically, the frequency of the sampling clock signal can be changed among a value corresponding to a data rate of 20 Mbps (equivalent to a recording data rate of 20 Mbps or half a recording data rate of 40 mbps) and a value corresponding to a data rate of 40 mbps (equivalent to half a recording data rate of 80 Mbps). When the third control signal corresponds to the predetermined mode ①, the frequency of the sampling clock signal is set to a value corresponding to a data rate of 20 Mbps (equivalent to a recording data rate of 20 Mbps). When the third control signal corresponds to the predetermined mode ②, the frequency of the sampling clock signal is set to a value corresponding to a data rate of 20 Mbps (equivalent to half a recording data rate of 40 mbps). When the third control signal corresponds to the predetermined mode ③, the frequency of the sampling clock signal is set to a value corresponding to a data rate of 40 mbps (equivalent to half a recording data rate of 80 Mbps).

Also, the mode detection decoder 115 outputs the third control signal to the speed-related voltage generation circuit 112. The speed-related voltage generation circuit 112 produces a speed-related voltage in response to the third control signal. The speed-related voltage matches a reproduced signal related to the recording data rate "d". The speed-related voltage generation circuit 112 applies the speed-related voltage to the VCO in the PLL circuit 111. In the PLL circuit 111, the frequency of the signal generated by the VCO is controlled by the speed-related voltage. The PLL circuit 111 responds to the speed-related voltage, extracting a clock signal from the output signal of the detector 109. If the initial voltage to the VCO in the PLL circuit 111 does not correspond to the recording data rate "d", the initial voltage is replaced by the speed-related voltage which matches a reproduced signal related to the recording data rate "d".

The mode detection decoder 115 generates a fourth control signal in response to the information piece of the used head number "n". The mode detection decoder 115 outputs the fourth control signal to the HSW pulse generation circuit 105. The HSW pulse generation circuit 105 produces an HSW pulse signal in response to the fourth control signal. The produced HSW pulse signal corresponds to the used head number "n". The HSW pulse generation circuit 105 feeds the HSW pulse signal to the switch circuit 104. The HSW pulse signal enables the number of used heads to be equal to the used head number "n". If the initial head number n1 differs from the used head number "n", the number of used heads is changed from the initial number n1 to the used head number "n". When the fourth control signal corresponds to the predetermined mode ②, the used head number "n" is set to "2". When the fourth control signal corresponds to the predetermined mode ②, the used head number "n" is set to "4". When the fourth control signal corresponds to the predetermined mode ③, the used head number "n" is set to "4".

The drum servo circuit 116 has a section for generating a signal depending on the rotation of the rotary drum 101 or the angular position of the rotary drum 101. The drum servo circuit 116 outputs the generated signal to the HSW pulse generation circuit 105. The HSW pulse generation circuit 105 adjusts the HSW pulse signal in response to the output signal of the drum servo circuit 116 so that the signal selection process (the head selection process) implemented by the switch circuit 104 will be in a suitable timing relation with the rotation of the rotary drum 101.

As understood from the previous explanation, the immediately after the initial stage of the playback process, the rotary drum speed (the head speed), the tape speed, and the used head number can be made into agreement with those used during the signal recording. In addition, the sampling clock generation circuit 108 and the speed-related voltage generation circuit 112 can be controlled into correspondence with the recording data rate.

What is claimed is:

1. A digital signal recording and reproducing apparatus comprising:

a plurality of rotatable first heads;

first means for selecting second heads from among the first heads, and recording a digital signal containing an information signal on a recording medium via the second heads while sequentially forming slant tracks on the recording medium;

second means for selecting third heads from among the first heads, and reproducing the digital signal from the recording medium via the third heads;

a reproduced signal processing circuit for processing the digital signal reproduced by the second means at a changeable data processing rate to recover the information signal from the digital signal reproduced by the second means;

third means for, during the recording by the first means, setting a rotational speed of the first heads, a feed speed of the recording medium, a data rate of the according, and a number of the second heads to changeable values respectively;

fourth means for allowing the first means to record the digital signal and a mode signal representative of the values set by the third means on the slant tracks on the recording medium at approximately a predetermined constant recording wavelength;

fifth means for, at a start of the reproducing by the second means, setting the rotational speed of the first heads, the feed speed of the recording medium, the data processing rate, and a number of the third heads to predetermined initial values respectively;

sixth means for detecting the mode signal in the digital signal reproduced by the second means;

seventh means for, after the start of the reproducing by the second means, substantially equalizing the rotational speed of the first heads, the feed speed of the recording medium, and the number of the third heads to the respective corresponding values represented by the mode signal detected by the sixth means; and eighth means for, after the start of the reproducing by the second means, controlling the data processing rate at a value substantially corresponding to the value of the data rate of the recording which is represented by the mode signal detected by the sixth means.

2. A digital signal recording and reproducing apparatus as recited in claim 1, wherein a value "d/(r•n)" remains approximately constant during the recording by the first means, and "d", "r", and "n" denote the rotational speed of the first heads, the feed speed of the recording tape, and the number of the second heads respectively.

3. A digital signal recording and reproducing apparatus as recited in claim 1, wherein the reproduced signal processing circuit comprises 1) a waveform equalizer for subjecting the digital signal reproduced by the second means to a waveform equalization process in response to a sampling clock signal determining the data processing rate, 2) a detector for converting an output signal of the waveform equalizer into a binary signal, 3) a phase locked loop circuit for reproducing a clock signal from an output signal of the detector, and 4) a discriminator for generating reproduced data from the output signal of the detector in response to the clock signal reproduced by the phase locked loop circuit, and wherein the eighth means comprises a sampling clock generation circuit for controlling a frequency of the sampling clock signal in response to the value of the data rate of the recording which is represented by the mode signal detected by the sixth means.

4. A digital signal recording and reproducing apparatus as recited in claim 1, wherein each of the slant tracks includes a main data area loaded with main information represented by the digital signal, and a subcode data area loaded with the mode signal.

5. A digital signal recording and reproducing apparatus as recited in claim 1, wherein the fourth means comprises means for allowing the first means to record the digital signal and the mode signal on the slant tracks on the recording medium at approximately the predetermined constant recording wavelength which is independent of a change in the head speed value set by the third means.

6. A digital signal recording and reproducing apparatus as recited in claim 1, wherein the fifth means comprises means for, at the start of the reproducing by the second means, setting the rotational speed of the first heads, the feed speed of the recording tape, the data processing rate, and the number of the third heads to the predetermined initial values respectively at which the mode signal, which has been recorded at approximately the predetermined constant recording wavelength, is enabled to be reproduced.

* * * * *